(12) United States Patent
Barrall et al.

(10) Patent No.: US 9,396,156 B2
(45) Date of Patent: Jul. 19, 2016

(54) SYSTEM AND METHOD FOR SOCIALLY ORGANIZED STORAGE AND SHARED ACCESS TO STORAGE APPLIANCES

(71) Applicant: Connected Data, Inc., Santa Clara, CA (US)

(72) Inventors: Geoffrey S. Barrall, San Jose, CA (US); John B. Turner, Sunnyvale, CA (US); David Gary Mendelson, San Carlos, CA (US); Brad Lee Morse, Sunnyvale, CA (US); Joel Feaster, Boise, ID (US)

(73) Assignee: Connected Data, Inc., Campbell, CA (US)

( * ) Notice: Subject to any disclaimer, the term of this patent is extended or adjusted under 35 U.S.C. 154(b) by 211 days.

(21) Appl. No.: 13/804,436

(22) Filed: Mar. 14, 2013

(65) Prior Publication Data

US 2013/0290464 A1    Oct. 31, 2013

Related U.S. Application Data

(60) Provisional application No. 61/638,866, filed on Apr. 26, 2012, provisional application No. 61/731,517, filed on Nov. 30, 2012, provisional application No. 61/731,518, filed on Nov. 30, 2012.

(51) Int. Cl.
*G06F 15/167* (2006.01)
*G06F 17/30* (2006.01)

(52) U.S. Cl.
CPC ........ *G06F 15/167* (2013.01); *G06F 17/30292* (2013.01)

(58) Field of Classification Search
None
See application file for complete search history.

(56) References Cited

U.S. PATENT DOCUMENTS

| | | | |
|---|---|---|---|
| 4,516,678 A | 5/1985 | Fotiadis et al. | |
| 5,363,273 A | 11/1994 | Ma | |
| D383,736 S | 9/1997 | Corrington et al. | |
| D387,052 S | 12/1997 | Laituri et al. | |
| 5,759,059 A | 6/1998 | Chang et al. | |
| D399,193 S | 10/1998 | Chang | |
| 6,480,955 B1 * | 11/2002 | DeKoning et al. | .... G06F 9/4411 |
| 6,496,362 B2 | 12/2002 | Osterhout et al. | |
| 6,798,650 B2 | 9/2004 | Reznikov et al. | |
| 7,088,579 B1 | 8/2006 | Konshak | |

(Continued)

FOREIGN PATENT DOCUMENTS

EP        0794646 A2    9/1997

OTHER PUBLICATIONS

International Searching Authority—European Patent Office, Partial International Search for PCT/US2013/038427, mailed on Apr. 24, 2014, 6 pages.

(Continued)

*Primary Examiner* — Chris Parry
*Assistant Examiner* — Soe M Hlaing
(74) *Attorney, Agent, or Firm* — Sunstein Kann Murphy & Timbers LLP

(57) ABSTRACT

In various embodiments, the present invention relates to systems and methods for managing user data in a plurality of storage appliances coupled to a wide area network. In some embodiments, the present invention relates to systems and methods that allow users to view and manipulate files in a shared virtual container. In other embodiments, the present invention also relates to systems and methods that allow users to access virtual containers located on storage appliances that are owned by other users.

20 Claims, 43 Drawing Sheets

(56) References Cited

U.S. PATENT DOCUMENTS

| | | | |
|---|---|---|---|
| 7,262,699 B2 | 8/2007 | Marsilio et al. | |
| 7,386,868 B2 | 6/2008 | McCormack | |
| 7,480,136 B2 | 1/2009 | Lalouette | |
| 7,570,484 B1 | 8/2009 | Sivertsen | |
| 7,639,490 B2 | 12/2009 | Qin et al. | |
| 7,679,896 B2 | 3/2010 | Deng et al. | |
| 7,925,627 B1 | 4/2011 | Brown et al. | 707/634 |
| 8,077,468 B2 | 12/2011 | Fujikawa | |
| 8,120,902 B2 | 2/2012 | Dozier et al. | |
| 8,310,827 B2 | 11/2012 | Huang et al. | |
| 8,331,084 B2 | 12/2012 | Chung et al. | |
| 8,456,832 B1 | 6/2013 | Brigham, Jr. et al. | |
| 8,480,039 B2 | 7/2013 | Chang | |
| 8,730,661 B2 | 5/2014 | Lai et al. | |
| 2002/0095547 A1* | 7/2002 | Watanabe et al. | G06F 3/0605 |
| 2002/0124081 A1 | 9/2002 | Primm et al. | |
| 2003/0099094 A1 | 5/2003 | Coles et al. | |
| 2003/0133388 A1 | 7/2003 | Syring et al. | |
| 2003/0177194 A1 | 9/2003 | Crocker et al. | |
| 2003/0212826 A1* | 11/2003 | Rapakko et al. | G06F 17/30575 |
| 2005/0138404 A1* | 6/2005 | Weik et al. | G06F 17/30067 |
| 2005/0171956 A1 | 8/2005 | O'Brien et al. | |
| 2005/0187937 A1* | 8/2005 | Kawabe et al. | G06F 21/6218 |
| 2007/0006244 A1 | 1/2007 | Huang | |
| 2007/0067349 A1 | 3/2007 | Jhaveri et al. | |
| 2007/0143281 A1 | 6/2007 | Smirin et al. | |
| 2007/0150484 A1 | 6/2007 | Funge et al. | |
| 2007/0162420 A1 | 7/2007 | Ou et al. | |
| 2007/0230105 A1 | 10/2007 | Su | |
| 2007/0274327 A1 | 11/2007 | Kaarela et al. | |
| 2008/0005120 A1* | 1/2008 | Li | G06F 17/301 |
| 2008/0157638 A1 | 7/2008 | Liu et al. | |
| 2008/0183642 A1 | 7/2008 | Akelbein et al. | |
| 2008/0197264 A1 | 8/2008 | Kuo | |
| 2008/0222127 A1 | 9/2008 | Bergin | |
| 2008/0235249 A1 | 9/2008 | Stephens et al. | |
| 2008/0256458 A1* | 10/2008 | Aldred et al. | G06F 21/6218 |
| 2009/0002936 A1 | 1/2009 | Lalouette | |
| 2009/0125522 A1 | 5/2009 | Kodama et al. | |
| 2009/0210454 A1 | 8/2009 | Sagar et al. | |
| 2010/0085700 A1 | 4/2010 | Chang | |
| 2010/0131620 A1 | 5/2010 | Kondamuru et al. | |
| 2010/0180034 A1 | 7/2010 | Weiner et al. | |
| 2010/0280907 A1 | 11/2010 | Wolinsky et al. | |
| 2010/0332401 A1 | 12/2010 | Prahlad et al. | |
| 2011/0047480 A1 | 2/2011 | Venkataraman | |
| 2011/0128695 A1 | 6/2011 | Fang et al. | |
| 2011/0141682 A1 | 6/2011 | Chen | |
| 2011/0213631 A1 | 9/2011 | Mislavsky | |
| 2011/0225362 A1 | 9/2011 | Leggette | |
| 2012/0104222 A1 | 5/2012 | Ding | |
| 2013/0033813 A1 | 2/2013 | Ling et al. | |

OTHER PUBLICATIONS

International Searching Authority—European Patent Office, International Search Report and Written Opinion for PCT/US2013/038427, mailed Jul. 1, 2014, 21 pages.

Satyanarayanan, M., et al, "Coda: A Highly Available File System for a Distributed Workstation Environment", *IEEE Transactions on Computers*, vol. 39, No. 4, Apr. 1990, pp. 447-459, 13 pages.

Korean Intellectual Property Office, Authorized Officer Ji, Jeong Hoon, International Search Report and Written Opinion for PCT/US2013/071898, mailed Mar. 27, 2014, 13 pages.

French Patent Office, Preliminary Search Report for French Application No. 1353867, mailed Dec. 7, 2015, 9 pages.

French Patent Office, Preliminary Search Report for French Application No. 1353867, 3 pages, date unknown (English Translation).

* cited by examiner

Fig. 29

Connected Data - David Mendelson

David Mendelson

Your Information
David Mendelson

Primary Email:
dave@connecteddata.com

Address:
line1
line2
city, CA 95054
United States

Account Stats
My Connected Folders:
3 Connected Folders

Other People's Connected Folders:
3 Connected Folders

Total Amount of Data:
0 MB

Connected Data
Connected Folders
Transporters
Messages
Help

Update Information | Manage Email | Account Preferences | Change Password

SYSTEM AND METHOD FOR SOCIALLY ORGANIZED STORAGE AND SHARED ACCESS TO STORAGE APPLIANCES

CROSS-REFERENCE TO RELATED APPLICATION(S)

This patent application claims the benefit of U.S. Provisional Patent Application No. 61/638,866 filed Apr. 26, 2012; U.S. Provisional Patent Application No. 61/731,517 filed Nov. 30, 2012; and U.S. Provisional Patent Application No. 61/731,518 filed Nov. 30, 2012, which are hereby incorporated herein by reference in their entireties.

TECHNICAL FIELD

The present invention relates to systems and methods for managing user data in a plurality of storage appliances coupled to a wide area network. More particularly, the present invention relates to systems and methods that allow users to view and manipulate files in a shared virtual container. Further, the present invention also relates to systems and methods that allow users to access virtual containers located on storage appliances that are owned by other users.

BACKGROUND ART

It is known in the prior art to manage user data in storage appliances.

SUMMARY OF THE EMBODIMENTS

In an embodiment of the invention there is provided a computer program product for propagating, over a wide area network, a change, to data in a local storage appliance, to a remote storage appliance. The computer program product includes a non-transitory computer-readable medium having computer readable program code stored thereon. When the computer readable program code is run by a processor in the local appliance, the code is configured to cause the local storage appliance to perform computer processes including receiving a change to data in a virtual container associated with the local storage appliance, wherein the virtual container is linked to a corresponding virtual container associated with the remote appliance; sending a request over a wide area network to a central server for information regarding the remote storage appliance linked to the virtual container; receiving over the wide area network from the central server identifying information for the remote storage appliance linked to the virtual container; and transmitting over the wide area network to the remote storage appliance a data update corresponding to the change.

In a further related embodiment, sending the request includes sending an identifier for the virtual container. Alternatively or in addition, sending the request includes sending a GetReplicationTargetsForContainer request. Also alternatively or in addition, receiving the identifying information includes receiving identifying information for the remote storage appliance, wherein the remote storage appliance is a member of a replication/synchronization group associated with the virtual container. Also alternatively or in addition, transmitting to the remote storage appliance includes establishing a peer-to-peer connection with the remote storage appliance. Alternatively or in addition, transmitting to the remote storage appliance includes establishing a secure connection over the wide area network with the remote storage appliance. Alternatively or in addition, transmitting to the remote storage appliance includes transmitting updated Container change history information. Alternatively or in addition, transmitting to the remote storage appliance includes transmitting updated file version history information. Alternatively or in addition, transmitting to the remote storage appliance includes transmitting updated file data. Alternatively or in addition, transmitting to the remote storage appliance includes transmitting updated metadata associated with files in the virtual container, wherein the metadata is associated with organization of the files. Optionally, the computer processes further include sending to the central server over the wide area network a status update message regarding the change.

In another embodiment of the invention there is provided a method of providing to a new user access to a given storage appliance coupled to a computer network. The method includes managing, at a server, a database system having owner account data governing access to storage appliances that are registered in the database system, wherein (i) each storage appliance is associated in the database system with at least one owner, (ii) the given storage appliance is one of the registered storage appliances and has a registered owner, and (iii) the storage appliances are configured to share data with each other on a peer-to-peer basis in accordance with permissions that are stored in the database system receiving at the server, from a computing device of the new user, a request for a list of virtual containers and storage appliances that the new user has permission to access; determining, by the server, that a registered owner of the given storage appliance has configured a virtual container on the given storage appliance to be shared with the new user; and sending, by the server, an identifier of the given storage appliance to the computing device of the new user, so that the computing device can access data on the given storage appliance on a peer-to-peer basis in accordance with permission stored in the database system.

In a further related embodiment, managing the database system includes receiving, by the server, an indication of an access grant to the new user for the virtual container on the given storage appliance, wherein the indication is received from the registered owner of the given storage appliance; and storing, by the server, information about the access grant to the new user. Optionally, receiving the indication of the access grant includes receiving, by the server, an indication of a grant of read access, a grant of read and write access, or a grant of write access.

In another related embodiment, managing the database system includes receiving, by the server, an indication of an access grant to a group of users, wherein the new user is a member in the group; and storing, by the server, information about the access grant to each member of the group. Alternatively or in addition, receiving the request for the list of virtual containers and storage appliances comprises receiving the request from a client application executing on the computing device. Alternatively or in addition, determining that the registered owner has configured the virtual container on the given storage appliance to be shared includes retrieving, by the server, the identifier of the given storage appliance from a list of storage appliances that the new user has permission to access. Optionally, determining that the registered owner has configured the virtual container on the given storage appliance to be shared includes displaying, by the server, information about the relative locations of the given storage appliance and the computing device of the new user. Optionally, displaying the information about the relative locations includes displaying, by the server, an indication that the given storage appliance and the computing device of the new user are located on the same local area network. Alternatively or in addition, displaying the information about the relative locations includes displaying, by the server, an indication that the given storage appliance and the computing device of the new user can communicate over a wide area network.

BRIEF DESCRIPTION OF THE DRAWINGS

The foregoing features of embodiments will be more readily understood by reference to the following detailed description, taken with reference to the accompanying drawings, in which:

FIG. 29 is a user interface screen including a window that is displayed when the user chooses the "Rename" icon from the set 2502 in FIG. 25;

FIG. 33 shows a user interface screen displaying information about the user and providing various controls to allow the user to update the information, manage email, set account preferences, and change password;

DETAILED DESCRIPTION OF SPECIFIC EMBODIMENTS

Figure 1:
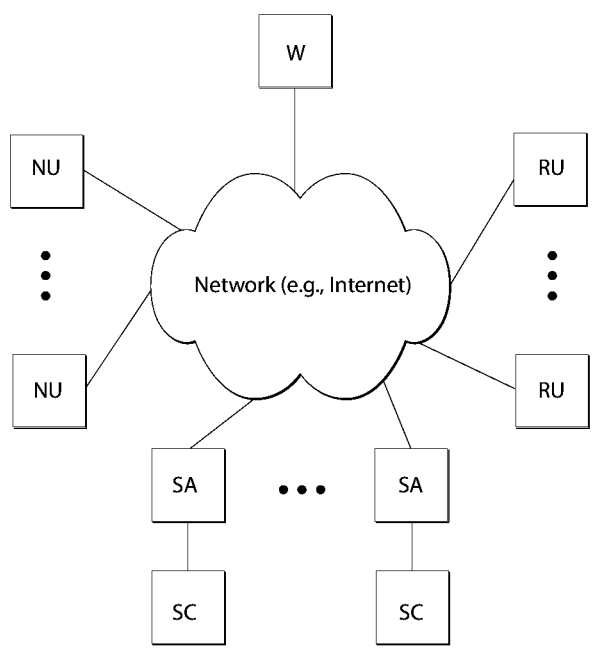
FIG. 1 is a schematic block diagram of system that includes a distributed data storage system with centralized web-based management and peer-to-peer data replication/synchronization, in accordance with an embodiment of the present invention.

Definitions. As used in this description and the accompanying claims, the following terms shall have the meanings indicated, unless the context otherwise requires:

A "container" is a logical token that is designated at the server level for partitioning of user data and which is implemented at the device level in physical storage.

"Transmitted directly" means transmitted without central service intermediary.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process," we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

A "central service" is a software-defined computer process, implemented on a set of servers, configured to support interoperable machine-to-machine interaction over a wide area network by managing and distributing relationship information. A central service in which the user interface is a web interface is referred to herein as a "web service." The central service may be free or fee-based. Central services may be provided through a single web site or through multiple web sites.

A "wide area network" is a communication network covering a plurality of geographically dispersed locations. Examples of wide area networks include the Internet, cable television networks, and cellular networks.

A "storage appliance" (sometimes referred to herein as a "file server device" or as a "portal device") is a storage device including at least one storage medium (e.g., a hard disk or solid state storage), a storage controller, and a network interface, in which the storage controller is configured to interoperate with other storage appliances and typically also with the central service over a wide area network such as the Internet. The network interface is generally wireless (e.g., WiFi) but may be wired (e.g., Ethernet). In various embodiments, the storage appliances have no direct user interface for managing containers and relationship information and instead are managed by the controller based on relationship information provided by the central service and optionally provided by other storage appliances. It is contemplated that storage appliances typically will be relatively inexpensive autonomous network-attached storage devices sold as a consumer product with essentially plug-and-play capabilities by virtue of the central service, capable of communicating with a user computer over a local area network and capable of communicating with one or more other storage appliances and with the central server over a wide area network. However, a computer may be configured to operate as a storage appliance in certain embodiments. In certain embodiments, a storage appliance may be configured to accept a mass storage device (e.g., a hard drive) and may be sold without the mass storage device, for example, to reduce the cost of the storage appliance while allowing the user to install his or her own mass storage device. In various alternative embodiments, the storage appliance may be configured to manage storage in an external storage system (e.g., an external hard drive, network-attached storage, cloud storage, etc.) in addition to, or in lieu of, having its own internal mass storage device.

A "registered user" or "RU" is a user of at least one of the services provided or managed by the central service that requires registration by the user, e.g., to set up a user account. Registered Users typically have a computer and at least one SA. The computer is used for accessing the central service and typically also for accessing the at least one SA, e.g., to access and store data. Registration may be fee-based or may be included essentially free with the purchase/ownership of a storage appliance. In certain embodiments, a registered user may define a container for use by one or more other users without associating the container with one of his or her own storage appliances (or even without that user having a storage appliance). Thus, for example, user may act as an administrator to define containers and relationships for establishing and sharing such containers by other users.

A "non-registered user" or "NU" is a user of at least one of the services provided or managed by the central service that does not require registration by the user. A Non-Registered User has a computer for accessing the central service.

A "computer" means a device including a processor, memory, and a network connection, such as a desktop computer, a laptop computer, a tablet computing device, a smartphone, an e-reader, or a video game console. In certain embodiments, a computer may be configured to operate as a storage appliance.

The term "level of sharing" of a set of containers of user data means a set of attributes specifying access to and control over user data in the set of containers. In various embodiments, the level of sharing is based on attributes including ownership as discussed in Section B below, types of containers as discussed in Section C below, and permissions/invitations as discussed in Section D below. Generally speaking, the level of sharing with another user may be (a) read-only (in which case we say that the user data is "published" to the other user), (b) read/write (in which case we say that the user data is "fully shared" with the other user), or (c) invisible (in which case the other user's set of storage appliances function to provide back-up protection of user data).

A "file system" is a scheme for organization of data, stored on a set of storage devices, in a manner that enables selective retrieval of such data from the set of storage devices.

A "set" generally includes at least one member, although, in the context of establishing information for registered users including a user account, a set of registered storage appliances, and a set of container designations, a set may have zero members. For example, a registered user may have no registered storage appliances and/or no container designations of his or her own, either temporarily or permanently.

A. System Description

In the following figures, dashed lines/arrows are used to represent communications that do not include user data, while solid lines/arrows are used to represent communications that include user data.

FIG. 1 is a schematic block diagram of system that manages the replication and synchronization of user data in accordance with an embodiment of the present invention. In particular, FIG. 1 schematically shows a distributed data storage system with central management and peer-to-peer data replication/synchronization, in accordance with an exemplary embodiment of the present invention. In this figure, "W" is the central service, "SA" are storage appliances, "RU" are registered users, "NU" are non-registered users, and "SC" are storage clients. SCs may be client computers or other devices that access files on an SA, which may be directly attached such as by a USB cable or network attached such as by a wired (e.g., Ethernet) or wireless (e.g., WiFi) network.

In certain exemplary embodiments of the present invention, the central service is used to establish relationships between registered users, their storage appliances, and information containers (described below) and provides relationship information to the storage appliances allowing the storage appliances to automatically and autonomously exchange and store user data in a peer-to-peer fashion. Importantly, none of the user data is stored at or by the central service or is even passed through or handled by the central service. The central service is unaware of the content of the user data and therefore does not have visibility to such things as data content, data types, directory/file names, etc. Even the identities of the users may be anonymous.

Certain exemplary embodiments of the present invention utilize a storage construct that is referred to herein as a "container." Within a storage appliance, a container is a physical storage entity (e.g., a folder in which directories may be created and files may be stored). For convenience, such a physical storage entity is referred to herein as a "Physical Container" or "PC." At the central service, a container is a virtual storage entity (essentially a unique number or token). For convenience, such a virtual storage entity is referred to herein as a "Virtual Container" or "VC." It is important to note that a virtual container is not associated with any physical storage at the central service.

In order for the central service to manage relationships and for the storage appliances to act on those relationships, each registered user, each virtual container, and each storage appliance is typically associated with a corresponding unique identifier (ID). Generally speaking, the central service assigns an identifier to each registered user and to each virtual container. Identifiers for the storage appliances are typically associated with the storage appliances themselves (e.g., globally unique identifiers) although the central service may assign identifiers for the storage appliances in addition to or in lieu of any identifier associated with the storage appliances (e.g., special identifiers for use within the system).

Using the central service, registered users define virtual containers. Generally speaking, each virtual container is "owned" by the registered user that creates it, although other types of ownership/permissions may be supported (e.g., conceivably, a virtual container could be created by one user but owned by another user, or ownership could be transferred from one user to another user). One or more registered users and/or specific storage appliances are given access to a particular virtual container. For example, the virtual container may be available to all registered users (i.e., a public container) or may be made available to a specific registered user or set of registered users. Different types of containers and different types of permission schemes are discussed more fully below.

A registered user who has been given access to a particular virtual container may associate that virtual container with one or more or his or her storage appliances. For convenience, the association of a virtual container with a storage appliance is referred to herein as "linking" or a "link" to the virtual container, and the process of making a virtual container available to other registered users and/or storage appliances is referred to herein as an "invitation" or "invite." In practice, an invitation may be active (e.g., an invitation may be sent or otherwise provided to a particular registered user, which the registered user can accept to have his or her storage appliance linked to the virtual container) or an invitation may be passive (e.g., permission may be given for a particular registered user to access the virtual container, in which case the registered user may access the central service and associate one of his or her storage appliances with the virtual container in order to have a corresponding physical container created on the storage appliance and synchronized with other storage appliances linked to the virtual container, as discussed more fully below). It is important to note that the invitation does not dictate where or how the container is to be stored by the registered user who accepts the invitation, but rather the registered user who accepts the invitation can configure where and how the container is to be stored (e.g., the accepting user may store the container in one storage appliance or in multiple storage appliances). In certain embodiments, the accepting user can choose to access the container remotely rather than having it replicated to one or more local storage appliances.

Thus, generally speaking, the central service maintains relationship information that associates each registered user with his or her virtual container(s) and storage appliance(s), associates each virtual container with the storage appliances that link to the virtual container, and associates each storage appliance with the virtual containers to which it links. This relationship information is demonstrated schematically by way of an example in Table 1.

TABLE 1

CENTRAL SERVICE
    Registered Users
        RU1
        RU2
    Storage Appliances
        SA1 (owned by RU1)
        SA2 (owned by RU2)
    Virtual Containers
        VC3 (owned by RU1)
        VC4 (owned by RU2, shared with RU1)
    RU1 owns:
        SA1
        VC3
    RU2 owns:
        SA2
        VC4
    SA1 linked to:
        VC3 (owned by RU1)
        VC4 (owned by RU2, linked by RU1 with permission from RU2)
    SA2 linked to:
        VC4 (owned by RU2)
    VC3 linked to:
        SA1
    VC4 linked to:
        SA2 (initial linkage established by RU2)
        SA1 (linkage established by RU1 with permission from RU2)

Table 1 shows that a first registered user RU1 has a storage appliance SA1 and creates a virtual container VC3 and a second registered user RU2 has a storage appliance SA2 and creates a virtual container VC4. RU1 has associated storage appliance SA1 with virtual container VC3, which, as discussed above, will have caused storage appliance SA1 to create a corresponding physical container associated with virtual container VC3. RU2 has associated storage appliance SA2 with virtual container VC4, which, as discussed above, will have caused storage appliance SA2 to create a corresponding physical container associated with virtual container VC4. RU2 has given permission to (e.g., invited) RU1 to access virtual container VC4, and RU1 has associated storage appliance SA1 with virtual container VC4, which, as discussed above, will have caused storage appliance SA1 to create a corresponding physical container associated with virtual container VC4.

Thus, the central service maintains information identifying:
    registered users RU1 and RU2;
    storage appliances SA1 and SA2; and
    virtual containers VC3 and VC4, and also maintains relationship information showing that:
    RU1 owns storage appliance SA1 and virtual container VC3;
    RU2 owns storage appliance SA2 and virtual container VC4;
    storage appliance SA1 is linked to virtual container VC3 and to virtual container VC4;
    storage appliance SA2 is linked to virtual container VC4;
    virtual container VC3 is linked to storage appliance SA1; and
    virtual container VC4 is linked to storage appliance SA2 and to storage appliance SA1.

Figure 2:
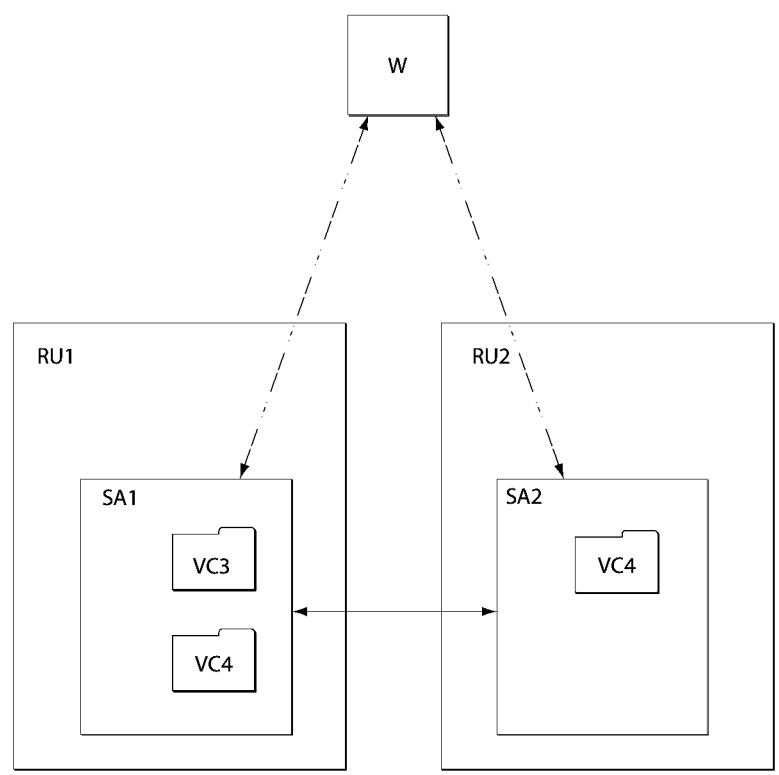
FIG. 2 schematically and graphically shows the relationship information that is maintained and managed by the central service, in accordance with an exemplary embodiment of the present invention, as detailed in Table 1.

FIG. 2 shows the above relationships graphically. Here, storage appliance SA1 includes physical containers (folders) associated with virtual containers VC3 and VC4, while storage appliance SA2 includes a physical container (folder) associated with virtual container VC4. The storage appliances communicate with the central service, e.g., to receive or obtain relationship information, but exchange user data directly so that the central service is not involved with the user data transfers.

It is important to note that the information in Table 1 and depicted in FIG. 2 is schematic, and the central service may store information in any of a variety of ways (e.g., using a relational database).

In certain embodiments, the user interface of the central service may allow relationships to be created and changed using typical graphical user interface (GUI) functions like "drag and drop" to link a particular storage appliance to a particular virtual container (e.g., the user may simply drag a graphical representation of the virtual container onto a graphical representation of the storage appliance) or "right clicking" to get a menu of options such as for creating a virtual container, creating a new storage appliance, etc.

When a virtual container is associated with a particular storage appliance, the central service sends relationship information to the storage appliance that allows the storage appliance to create a corresponding physical container in its storage medium and to replicate/synchronize the contents of the physical container with other storage appliances that are linked to the virtual container. This relationship information typically includes, among other things, the identifier for the virtual container. The storage appliance creates the physical container and typically associates (internally) the physical container with the identifier of the virtual container. Replication/synchronization is discussed in more detail below.

Initially, a single storage appliance may be linked to a particular virtual container. For example, upon creating a virtual container, the creator/owner typically associates the virtual container with one of his or her storage appliances, which, as discussed above, causes the storage appliance to create a corresponding physical container (e.g., a folder) in its storage medium based on relationship information provided by the central service. The physical container initially may be empty (although provisions may be made for an existing folder to be associated with the virtual container) and the user may then store data in the physical container, completely independently of the central service.

Over time, one or more other storage appliances may be linked to the virtual container. For example, the creator/owner may link multiple of his or her own storage appliances to the virtual container (e.g., for backup/redundancy purposes). Additionally or alternatively, one or more other users may link a storage appliance to the virtual container, e.g., in response to an invitation from the creator/owner. As discussed above, each storage appliance that is linked to the virtual container creates a corresponding physical container in its storage medium.

When two or more storage appliances are linked to a particular virtual container, the storage appliances automatically and autonomously replicate/synchronize the contents of the corresponding physical containers based on relationship information provided to the storage appliances by the central service. The relationship information provided to a given storage appliance typically includes, among other things, the identifier for the virtual container and also may contain identifying information for one or more other storage appliances that link to the same virtual container. As discussed above, such replication/synchronization is directly between the storage appliances in a peer-to-peer fashion without involvement or visibility by the central service. The storage appliances may support different types of replication/synchronization schemes, e.g., based on such things as the type of virtual container and the permissions associated with the virtual container. Replication/synchronization is discussed more fully below.

Replication/synchronization typically involves one of the relevant storage appliances contacting another relevant storage appliance to initiate a replication/synchronization protocol exchange. This protocol exchange typically involves authentication by one, the other, or both storage appliances, i.e., to ensure that each storage appliance has permission to send or receive container contents. This authentication may involve communication with the central service, e.g., to obtain relationship information or other authentication information from which the storage appliance can decide whether or not to proceed. This communication with the central service may be responsive to a request from another storage appliance (e.g., upon receiving a request to initiate the protocol exchange) or may be prior to receiving a request to initiate the protocol exchange (e.g., the central service may push updated relationship information or authentication information to the storage appliance in anticipation of the protocol exchange, such as sending updated relationship information to various storage appliances when a new storage appliance links to the virtual container).

In certain embodiments, the central service may have limited visibility to certain physical container metadata attributes such as the amount of data in a container, e.g., to assist with the central service's management of relationships.

B. Ownership

Generally speaking, each virtual container is "owned" by a particular registered user or RU/SA pairing. The owner of a virtual container may be given special privileges with respect to the container, such as, for example, the ability to invite others to access the container, the ability to write/modify the contents of the container, or the ability to delete the container. In exemplary embodiments, when the owner of a virtual container deletes the virtual container, the corresponding physical containers in all of the affected storage appliances are deleted, although individual non-owners may unlink from the virtual container (e.g., by accessing the central service and disassociating the virtual container from the storage appliance), in which case the corresponding physical container would be deleted from the user's storage appliance but no other storage appliances.

Further, each storage appliance is "owned" by a particular registered user. When a user registers the storage appliance with the central service, the central service stores information about this relationship. In some embodiments, the owner of a storage appliance is the only registered user who can access the storage appliance and/or the storage appliance's contents. In various embodiments, the owner may grant permission for other users, registered or non-registered, to access the storage appliance.

In some embodiments, the owner may limit the access granted to non-owners. For example, the owner may allow non-owners to access only the virtual containers on the storage appliance that have been shared with the non-owners. In these situations, the non-owners could view a virtual container only if their own storage appliances were already linked to the container. All other virtual containers on the owner's storage appliance would be invisible to the non-owners (e.g., the owner's personal files, virtual containers that are shared with other users but not the non-owners being granted access to the storage appliance). In another example, the owner may grant only read access rights to the virtual containers to the non-owners. Thus, even if the non-owners would be allowed to edit the contents of the virtual containers if they were accessing their own storage appliances, they would not be able to make edits while accessing the containers through other user's storage appliances.

C. Types of Containers

In various embodiments, each virtual container may be associated with a container "type" so as to allow different kinds of processing for different types of containers. Without limitation, some exemplary types of containers that may be supported in various embodiments include:

Normal Container—This type of container would be replicated/synchronized among all storage appliances that support the corresponding virtual container. Data may be modified in the physical container at any storage appliance, with the changes propagated to/among the other storage appliances using a replication/synchronization/reconciliation mechanism as described herein. Embodiments typically will include mechanisms for coordinating and reconciling changes, since changes may be made concurrently at different storage appliances, and the changes may be inconsistent with one another. Rules may be set up (and may be configurable) for reconciling changes.

Backup Container—This type of container would be used by one registered user to store a backup copy of a physical container from one storage appliance on one or more other storage appliances, which could be associated with the same registered user or a different registered user. Since this type of container is for backup purposes, as opposed to data sharing/distribution purposes, the contents of the backup container stored at the other storage appliance(s) typically would be hidden or otherwise made inaccessible (e.g., a hidden folder with the data encrypted).

Read-Only Container—This type of container would be used by a designated user (typically the registered user or owner) to distribute read-only copies of a physical container (essentially a reference version of the container) to one or more other storage appliances, which could be associated with the same registered user and/or one or more other registered users. Changes made to the reference version of the container would be propagated to the other storage appliances, but those other storage appliances would prevent changes from being made to the read-only instantiations.

Add-Only Container—This type of container is a variation on the normal container, in that modifications are limited to adding new files/directories to the container. Add-only containers might facilitate coordination and reconciliation of changes being made across the various storage appliances.

D. Permissions/Invitations

In various embodiments, different types of permissions/invitations may be supported for virtual containers, such as, for example:

Public—any registered user is able to create a link to the virtual container.

Private—only the owner is able to link his or her own storage appliances to the virtual container, e.g., to allow for private/personal backup or replication.

Single—only a single designated registered user may create a link to the virtual container (in addition to the creator/owner).

Group—only a designated group of registered users may create a link the virtual container.

E. Replication/Synchronization Groups

In order to coordinate replication/synchronization for a particular virtual container among a number of storage appliances that link to the virtual container, the central service may define replication/synchronization groups that specify, for a given storage appliance, which other storage appliance(s) the given storage appliance will communicate with in order to perform replication/synchronization of the contents of its physical container. Such replication/synchronization groups may be particularly useful for virtual containers that are linked to a large number of storage devices, where the group construct can limit the amount of "traffic" any particular storage appliance must handle. Alternatively or in addition, in certain embodiments, the controller of each storage appliance has bandwidth management logic, to limit the total network traffic generated or received by the storage appliance, so as to avoid undue burdening of the network connection. Such logic provides for other devices or computers that are sharing a network connection to have fair access to the total bandwidth provided by the network connection.

F. Reconciliation

As discussed above, in some types of virtual containers, various users may modify the contents of their respective physical containers, and such modifications may, in some cases, be made concurrently and/or inconsistently. For example, two users may attempt to modify a particular file at the same time. Two users may create different files with the same name. One user may delete a file that another user wants to keep.

Therefore, the controllers of the storage appliances generally will have reconciliation logic through which replication/synchronization can be accomplished. For many types of situations, there is not one correct way to perform reconciliation, and therefore reconciliation may be rule-based to some degree with management of the rules by the central service.

G. Non-Registered User Sending Data to Registered User

In certain embodiments, a non-registered user may send data to a registered user, again coordinated by the central service but without the central service having any access to the user data.

Figure 3:
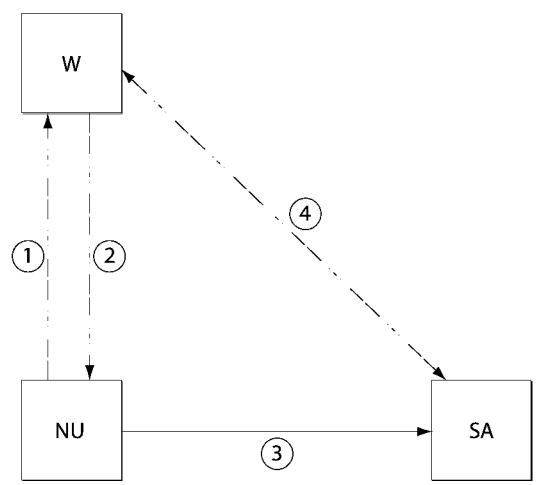
FIG. 3 is a schematic diagram showing exemplary communication flows allowing a non-registered user to send data to a registered user with relationship management by the central service and direct data transfer to the registered user's storage appliance, in accordance with an exemplary embodiment of the present invention.

In an exemplary embodiment, described with reference to FIG. 3, such a transfer involves the non-registered user accessing the central service from the web browser of his or her computer (arrow 1). The central service may display a web page in which the non-registered user can enter an identifier or token for the registered user (e.g., the registered user may provide others with his or her token, such as by including the token on a business card), or the web page may allow the non-registered user to search for the registered user. In any case, once the central service knows the identity of the registered user to which the non-registered user wants to send data, the central service returns to the non-registered user's computer an application (arrow 2), typically in the form of a web page with embedded application. This application runs on the non-registered user's computer, contains relevant information (e.g., an identifier associated with a storage appliance), and implements the protocols necessary to send data specified by the non-registered user (e.g., the application may allow the non-registered user to browse for a file or otherwise specify or enter data) to one or more of the registered user's storage appliances directly without any handling of the data by the central service (arrow 3). The storage appliance communicates with the central service as needed to obtain relevant relationship information to enable the storage appliance to receive the data directly from the non-registered user (arrow 4).

The user data sent by the non-registered user may be stored in a designed "inbox" in one or more of the registered user's storage appliances, as can be configured by the registered user through the central service. The data may be sent to a single one of the storage appliances and then replicated with one or more other storage appliances using the replication/synchronization mechanisms as discussed herein.

In this scenario, the central service is essentially involved to set up and manage a temporary relationship between the non-registered user and the registered user's storage appliance(s), so that the storage appliance(s) can authenticate that the non-registered user is authorized to send data to the inbox(es). If the data from the non-registered user is to be replicated among multiple storage appliances, the central service may manage this by essentially setting up a virtual container, linking all of the storage appliances to the virtual container, and sending relationship information to the storage appliances so that the data received by a storage appliance from the non-registered user is placed in a corresponding physical container and then replicated to the related physical containers in the other storage device(s).

H. Registered User Sending Data to Non-Registered User

In certain embodiments, a registered user may send data to a non-registered user, again coordinated by the central service but without the central service having any access to the user data.

Figure 4:
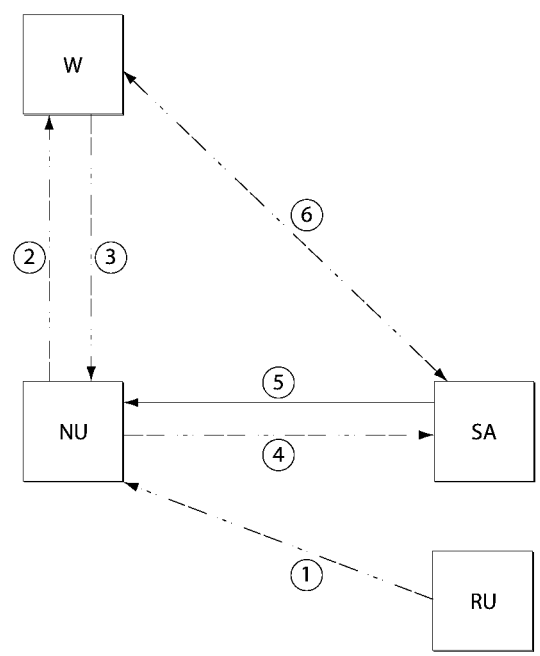
FIG. 4 is a schematic diagram showing exemplary communication flows allowing registered user to send data to a non-registered user with relationship management by the central service and direct data transfer from the registered user's storage appliance, in accordance with an exemplary embodiment of the present invention.
Figure 5:
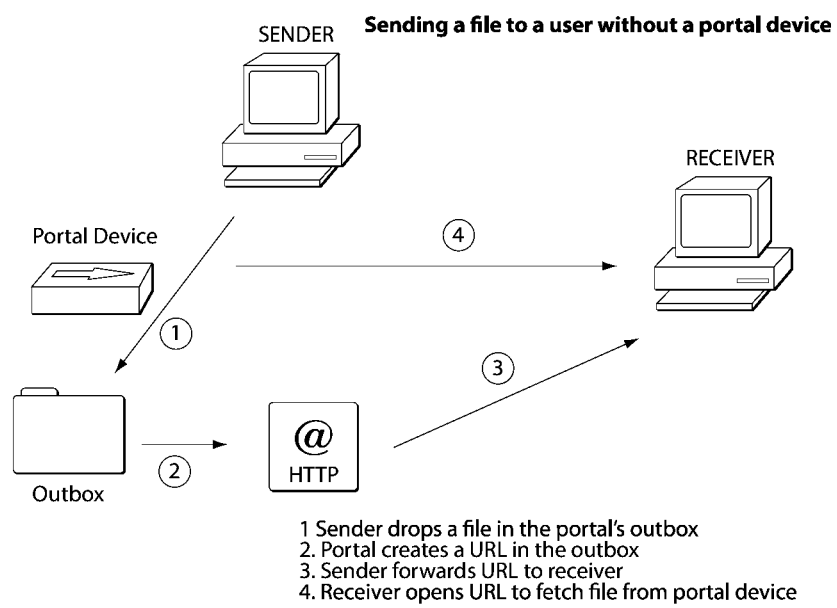
FIG. 5 is a schematic diagram further illustrating a method in accordance with an embodiment of the present invention by which a Registered User having a Storage Appliance (therein called a "portal device") may send file to a non-registered user.
Figure 6:
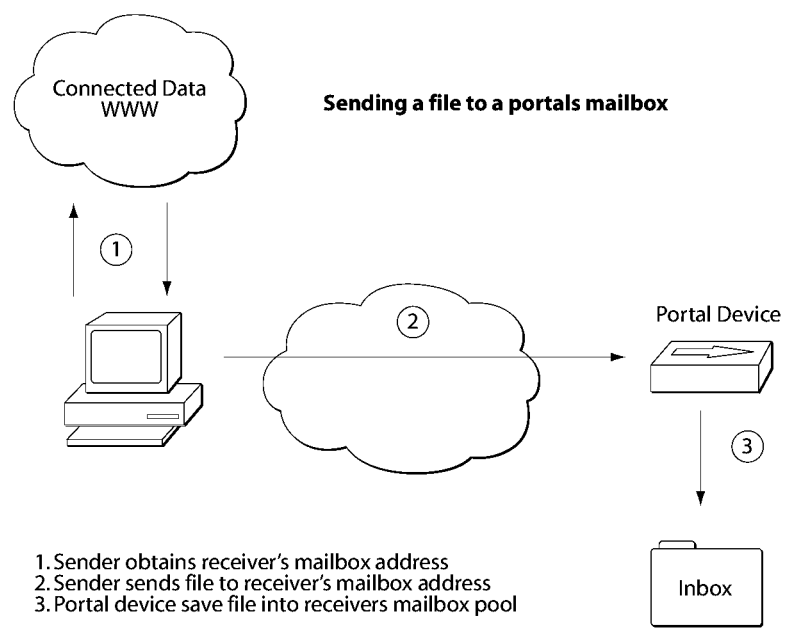
FIG. 6 is a schematic diagram further illustrating a method in accordance with an embodiment of the present invention for sending a file to a Registered User who has a Storage Appliance (therein called a "portal device")

In an exemplary embodiment, described with reference to FIG. 4, such a transfer involves the registered user sending an email or other communication (arrow 1) to the non-registered user containing a link (e.g., URL) directed the non-registered user to the central service and optionally containing relevant information, e.g., a token for the registered user or registered user's SA and/or a token associated with the data being sent by the registered user). When the non-registered user clicks on the link, the non-registered user's computer communicates with the central service (arrow 2), which returns an application (arrow 3), e.g., in the form of a web page with embedded application. This application runs on the non-registered user's computer, contains relevant information (e.g., an identifier for a storage appliance), and implements the protocols necessary to contact a designated storage appliance containing the data (arrow 4) and receive the data from the storage appliance (arrow 5). The storage appliance communicates with the central service as needed to obtain relevant relationship information to enable the storage appliance to send the data directly to the non-registered user (arrow 6). The user data received by the application running in the non-registered user's computer may be stored in location designated by the non-registered user.

In this scenario, the central service is essentially involved to set up and manage a temporary relationship between the non-registered user and the registered user's storage appliance(s), so that the storage appliance(s) can authenticate that the non-registered user is authorized to receive the data from the storage appliance.

In order to generate the communication represented by arrow 1, the registered user's computer may have a stand-alone application (e.g., downloaded from the central service), or the registered user may use a web browser to access the central service to obtain the application (e.g., a web page embedded with the application). The application running in the registered user's computer may communicate with the central service to inform the central service of the relevant details of the transfer, for example, so that the central service can correlate the communication represented by arrow 2 with this particular transfer so that the appropriate temporary relationship can be established by the central service.

I. Advantages and Comparison with Other Technologies

Compared to some file storage/sharing systems, the central service does not store the user data and does not have access/visibility to the user data. Rather, the storage appliances exchange and store user data directly among themselves. Thus, the central service does not have visibility to the content, type of content, file/directory structure of the content, whether the content is copyright protected, whether the content is illegal, etc. Among other things, this should help to insulate the central service and its operators from issues that have plagued other file sharing sites.

Compared to some file storage/sharing systems (e.g., backing up data in the cloud), data is replicated on physical storage appliances that can be disconnected/moved with the data in place, and therefore the storage appliances can be used offline. If, while the storage appliance is offline, changes are made in that storage appliance or in other storage appliances linked to a particular virtual container, those changes are replicated/synchronized/reconciled when the storage appliance is back online.

The described system can be used in a wide range of applications, such as, for example, data sharing, data backup, data distribution, collaboration, etc.

Since the central service does not store or handle the user data, the central service is not a bottleneck for the replication/synchronization/reconciliation aspects of the system and therefore the central service generally does not place size constraints on the user data, as other services that store or handle data often do. Thus, it does not matter to the central service if containers are very small or very large (even terabytes). To the extent that the central service is involved with managing the relationships, the storage and communication load at the central service are relatively small compared to other services that store or handle user data.

J. Exemplary Storage Appliance Management Processes

Figure 7:
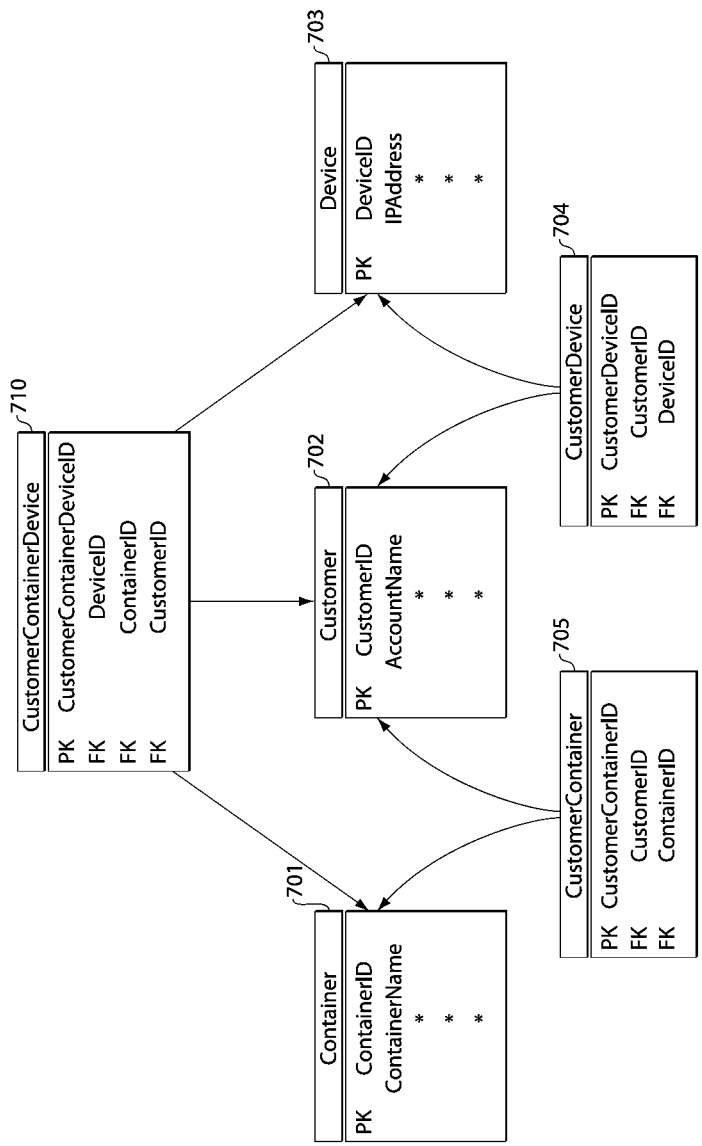
FIG. 7 is a schematic diagram illustrating the schema of the database used by the central service in managing Storage Appliances in accordance with an embodiment of the present invention.

FIG. 7 is a schematic diagram illustrating the schema of the database used by the central service in managing Storage Appliances in accordance with an embodiment of the present invention. Item 701 is the primary identifier of a record in the Container table being used as a reference to that Container record from within a CustomerContainerDevice record 710. Item 702 is the primary identifier of a record in the Customer table being used as a reference to that Customer record from within the CustomerContainerDevice record 710. Item 703 is the primary identifier of a record in the Device table being used as a reference to that Device record from within the CustomerContainerDevice record 710. Together, items 701, 702, and 703 describe a relationship between a container, a customer, and a device. Item 704 is the primary identifier of a record in the CustomerDevice table being used as a reference to that Customer Device record from within the Device table 703. Item 705 is the primary identifier of a record in the CustomerContainer table being used as a reference to that Customer Container record from within the Container record 701. Item 704 defines a relationship between a customer and a device, and item 705 defines a relationship between a customer and a Container.

Figure 8:
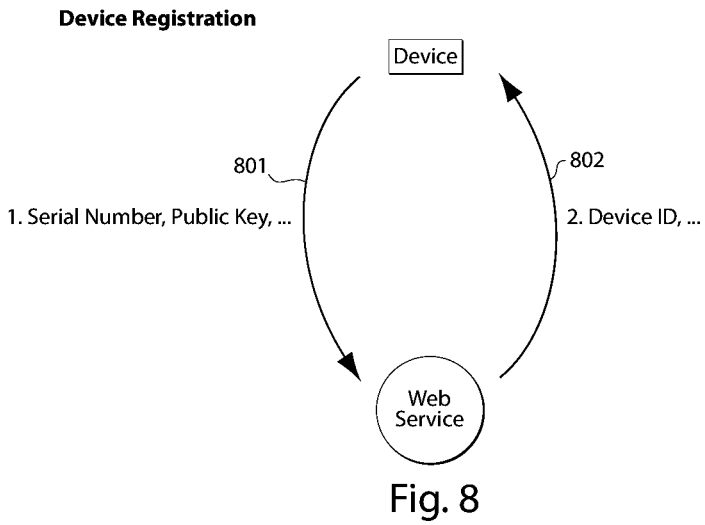
FIG. 8 is a schematic diagram illustrating logical processes involved in carrying out registration of a Storage Appliance (therein called a "Device") with the central service in accordance with an embodiment of the present invention.

FIG. 8 is a schematic diagram illustrating logical processes involved in carrying out registration of a Storage Appliance (therein called a "Device") with the central service in accordance with an embodiment of the present invention. In process 801 the device contacts a central service and submits a registration request with its unique information such as its serial number and public encryption key. In process 802 the central service responds to the process 801 request, returning the unique identifier for the registering device from the Device collection described in FIG. 7.

Figure 9:
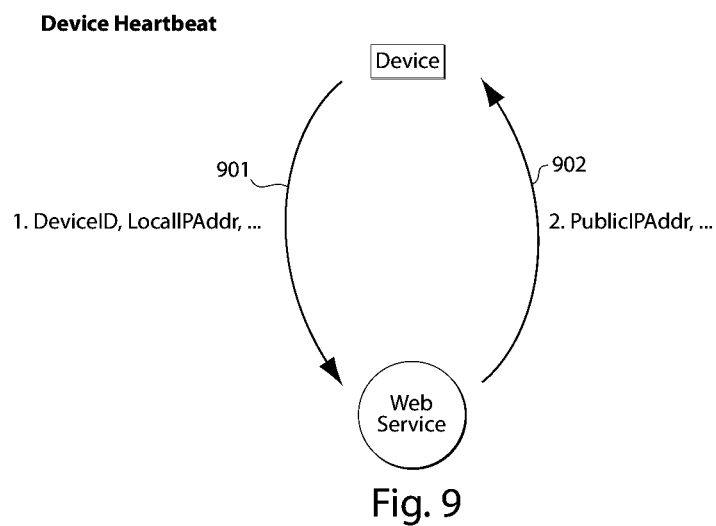
FIG. 9 is a schematic diagram illustrating logical processes (therein called a "heartbeat") involved in two-way communication between the central service and a Storage Appliance (therein called a "Device") for reciprocal notification of online availability of each one for carrying out instructions commanded by the other, in accordance with an embodiment of the present invention.

FIG. 9 is a schematic diagram illustrating logical processes (therein called a "heartbeat") involved in two-way communication between the central service and a Storage Appliance (therein called a "Device") for reciprocal notification of online availability of each one for carrying out instructions commanded by the other, in accordance with an embodiment of the present invention. In Process 901 the device contacts the central service and submits a heartbeat request with its unique identifier and its current local IPAddress. In process 902 the central service responds to the process 901 submission, returning the public IPAddress of the request to the querying device.

Figure 10:
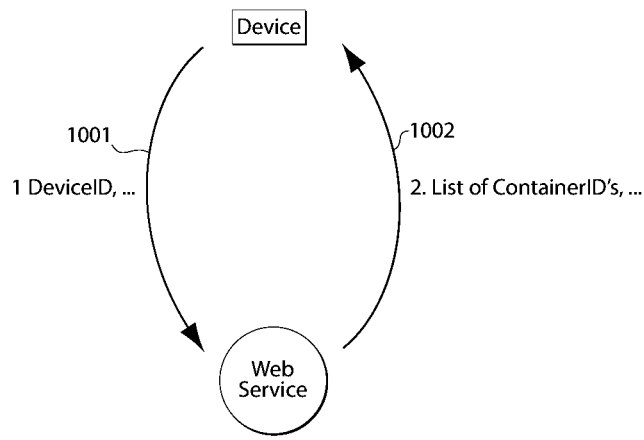
FIG. 10 is a schematic diagram illustrating logical processes in a "Get Containers" process by which the central service updates a Storage Appliance (therein called a "Device") with respect to Containers assigned to the Storage Appliance in accordance with an embodiment of the present invention.

FIG. 10 is a schematic diagram illustrating logical processes in a "Get Containers" process by which the central service updates a Storage Appliance with respect to Containers assigned to the Storage Appliance in accordance with an embodiment of the present invention. In process 1001 the device contacts the central service and submits a GetContainers request with its unique identifier. In process 1002, the central service responds to the process 1001 submission, returning a list of the device's containers as defined by the schema in the CustomerContainerDevice collection in FIG. 7.

Figure 11:
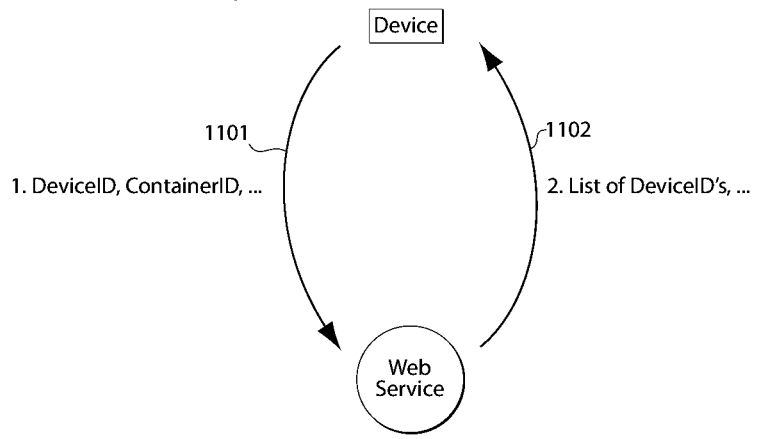
FIG. 11 is a schematic diagram illustrating logical processes in a "Get Replication Target Devices for Container" process by which the central service updates a Storage Appliance (therein called a "Device") with respect to other Storage Appliances currently holding the same logical container in accordance with an embodiment of the present invention.

FIG. 11 is a schematic diagram illustrating logical processes in a "Get Replication Target Devices for Container" process by which the central service updates a Storage Appliance with respect to other devices currently holding the same logical container in accordance with an embodiment of the present invention. In process 1101 the device contacts the central service and submits a GetReplicationTargetsForContainer request with its unique identifier. In process 1102 the central service responds to the process 1101 submission, returning a list of other devices currently holding the same logical container as defined by the schema in the CustomerContainerDevice collection in FIG. 7.

Figure 12:
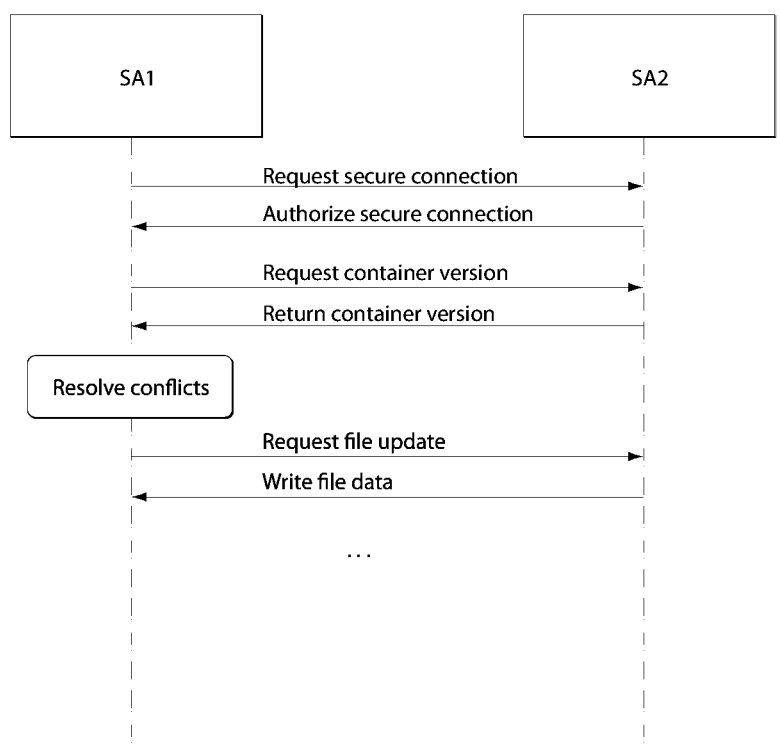
FIG. 12 is a schematic diagram illustrating logical processes in peer-to-peer communication between a first Storage Appliance (therein identified as "SA1") and a second Storage Appliance (therein identified as "SA2")

FIG. 12 is a schematic diagram illustrating logical processes in peer-to-peer communication between a first Storage Appliance (therein identified as "SA1") and a second Storage Appliance (therein identified as "SA2"). SA1 creates a network connection to SA2 and sends a request to establish a secure connection. If SA1 has an authorized relationship with SA2, SA2 accepts the connection request and sends back an acceptance of the connection. After SA1 receives the connection acceptance, it adds SA2 to its active Device list and begins requesting Container change history information from SA2 on a regular interval. When SA1 receives Container change history information from SA2 that it has not seen before, it processes the new information in an attempt to resolve any conflicts with any other Device change history information related to this same Container. Following this conflict resolution, SA1 requests SA2 to send any modified files to SA1 to update its copy of the Container. This process repeats until both SA1 and SA2 have the same file data in their respective copies of the Container. Alternatively, in another embodiment, SA2 may broadcast any new Container change history to SA1. SA1 would then process the new information in an attempt to resolve any conflicts with any other Device change history information related to this same Container. Following this conflict resolution, SA1 requests SA2 to send any modified files to SA1 to update its copy of the Container. This process repeats until both SA1 and SA2 have the same file data in their respective copies of the Container.

Figure 13:
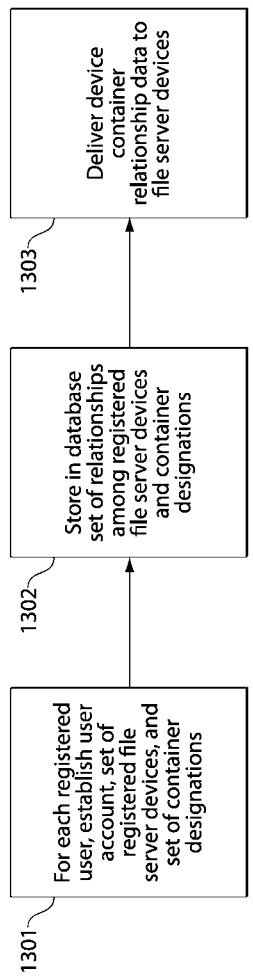
FIG. 13 is a block diagram of processes in a method of managing a distributed file system in accordance with an embodiment of the present invention.

FIG. 13 is a block diagram of processes in a method of managing a distributed file system in accordance with an embodiment of the present invention. The file system of this embodiment has a plurality of dedicated storage appliances coupled to the Internet. In process 1301, a web server, coupled to a database system and to the Internet, establishes, for each registered user, a user account, a set of registered storage appliances, and a set of container designations for storage of data. Process 1302 includes storing in the database system a set of relationships, established by the users, among the registered storage appliances and the container designations. In process 1303, a central service process, coupled to the database system, causes delivery of device-container relationship data to the storage appliances so as to enable the devices to substantiate the containers therein, and to replicate files with other devices that have substantiated corresponding containers, in a manner consistent with the stored relationships, and wherein the central service process operates without interaction with data stored in the containers.

Figure 14:
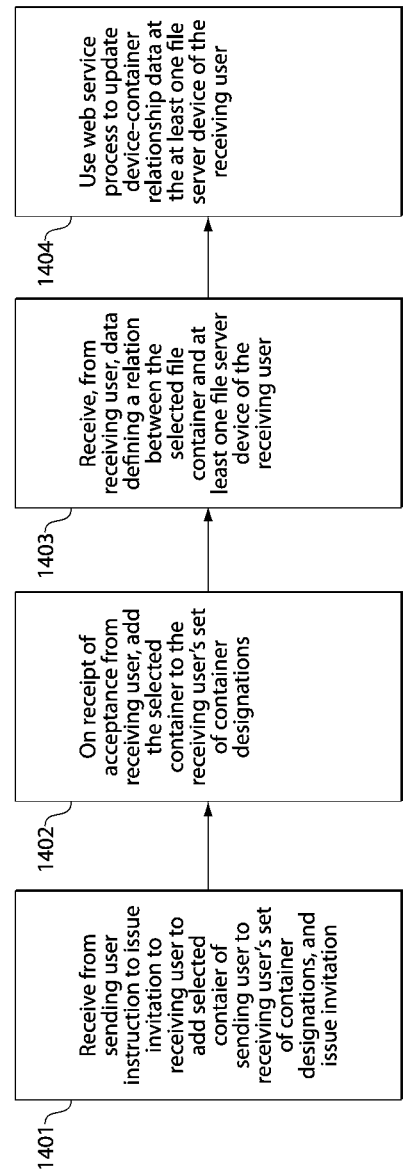
FIG. 14 is a block diagram of processes involved in relationship management in accordance with a further embodiment of the present invention.

FIG. 14 is a block diagram of processes involved in relationship management in accordance with a further embodiment of the present invention. Process 1401 includes receiving from a sending user an instruction to issue an invitation to a receiving user to add a selected container of the sending user to the receiving user's set of container designations and responsive thereto issuing the invitation. Process 1402 includes, on receipt of acceptance from the receiving user of the invitation, adding the selected container to the receiving user's set of container designations. Process 1403 includes receiving, from the receiving user, data defining a relation between the selected container and at least one storage appliance of the receiving user. Process 1404 includes using the central service process to update device-container relationship data at the at least one storage appliance of the receiving user.

In a related embodiment of the present invention, there may be provided a plurality of web servers. As in the embodiments above using a single web server, each web server in this embodiment is coupled to a database system and to the Internet, and has a central service process coupled to the database system. These web servers are operated to synchronize data in the database systems, so that each database system replicates data in each of the other database systems. In one implementation of this embodiment, a primary web server handles all user registration and container designations, and the primary server causes replication of its database system data to all of the other database system associated with the other servers. Alternatively, all of the web servers may operate on a peer-to-peer basis and replicate their data on a peer-to-peer basis. In any event, regardless of the manner of achieving the replication, the use of a plurality of web servers permits handling of a greater number of dedicated storage appliances. As the number of dedicated storage appliances increases, there can be an increase in the number of web servers used to communicate with them. Although, as discussed above, a web server does not handle data stored in the containers, and therefore can service a large number of containers and a large number of storage appliances, nevertheless at some point a web server can be overburdened, and using a plurality of web servers enables scaling of resources to handle an arbitrarily large number of containers and storage appliances. The load handled by the central service processes running on the various web servers can be allocated according to any of a number of convenient methods. Under one method, for example, the allocation can be made according to users and activity. Thus a first one of the N web servers can run central service processes for (1/N) of the registered users, etc. This allocation scheme can be modified as necessary in case one of the servers, for example, experiences activity that exceeds an average level of activity.

K. Storage Client

As discussed above, storage clients may be client computers or other devices that access files on a storage appliance, which may be directly attached such as by a USB cable or network attached such as by a wired (e.g., Ethernet) or wireless (e.g., WiFi) network. In essence, to the storage client, the storage appliance looks like a local or remote storage device, and the storage client can interact with the storage appliance substantially as it would with other types of storage devices, e.g., to create files and directories, to read files, to write files, etc. It also can access containers that were established via the central service and synchronized to the storage appliance.

In certain embodiments, at least some of the storage clients run a client application (which may be referred to herein as the "Connected Desktop" application) that interacts with the storage controller of the storage appliance to provide enhanced functionality for containers that are managed on or through the storage appliance and also enhanced functionality for how such containers are managed by the storage client.

In one particular exemplary embodiment, the client application allows the user to choose, on a container-by-container basis, whether the container is cached locally on the storage client or accessed remotely from the storage appliance. In essence, when a container is created in the storage appliance, a virtual directory is created on the client computer system that selectively can either keep a locally-cached version of the container or require access to the storage appliance when the user is using the directory. When remote access of a container is selected, storage operations between the storage client and the storage appliance are substantially the same as when a storage client accesses a traditional storage device, e.g., read/write accesses primarily are sent to, and satisfied by, the storage appliance. Among other things, the remote access option tends to ensure that reads are satisfied with the most recent version of the file and writes are committed immediately to storage, but suffers from delays that are typical of such synchronous access. When local caching of a container is selected, a local copy of the container and its contents is created on the storage client, and read/write accesses are sent to, and satisfied from, the cached copy; a synchronization procedure is run by the storage application in the storage client and the storage controller in the storage appliance to update the container in the storage appliance with any changes made to the cached copy and to update the cached copy with any changes made to the container in the storage appliance (e.g., changes made via the central service and/or via synchronization with one or more peer storage appliances). Among other things, the local caching option generally provides for faster read and writes, since the read/write accesses do not have to be completely synchronously with the storage appliance, but a back-end synchronization process is needed to synchronize the cached copy with the copy on the storage appliance.

Figure 35:
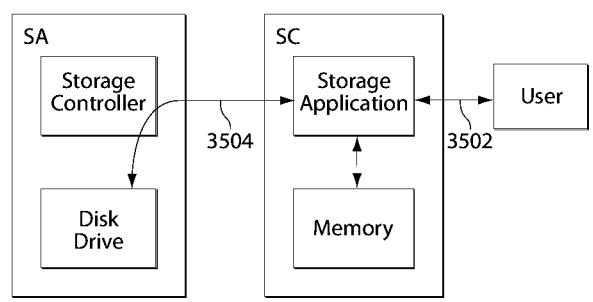
FIG. 35 is a schematic diagram depicting operation of the remote access option, in accordance with one exemplary embodiment.

FIG. 35 is a schematic diagram depicting operation of the remote access option, in accordance with one exemplary embodiment. Here, storage access requests 3502 from the user are processed in the storage client by the storage application, which satisfies the storage access requests by communication with the storage controller in the storage appliance, e.g., to read a file or write a file.

Figure 36:
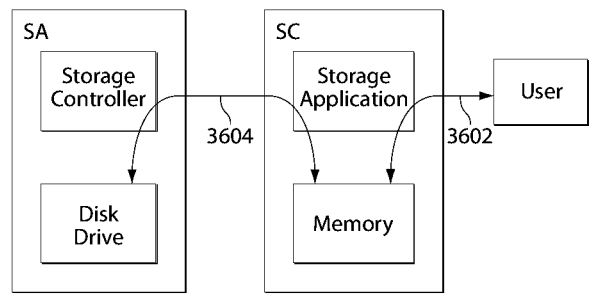
FIG. 36 is a schematic diagram depicting operation of the local caching option, in accordance with one exemplary embodiment.

FIG. 36 is a schematic diagram depicting operation of the local caching option, in accordance with one exemplary embodiment. Here, storage access requests 3602 from the user are processed locally by the storage application in the storage client using a cached copy of the container maintained in the local memory. The storage application in the storage client and the storage controller in the storage appliance interact to synchronize the copies of the container maintained in the disk drive of the storage appliance and the local memory of the storage client.

Moreover, in certain embodiments, the storage application allows the user to dynamically switch between remote access and local caching on a container-by-container basis. Specifically, the storage application includes a user interface by which the user can select, on a container-by-container basis, and dynamically, whether the container will be locally cached or remotely accessed. When switching a container from remotely accessed to locally cached, the storage application in the storage client will interact with the storage controller in the storage appliance to copy the contents of the container to the local memory in the storage client and to establish the back-end synchronization process. When switching a container from locally cached to remotely accessed, the storage application in the storage client performs a synchronization process to ensure that any changes made to the locally cached copy are committed to the disk drive in the storage appliance, and thereafter the storage application remotely accesses the container rather than accessing the (previously) locally cached copy of the container.

Figure 37:
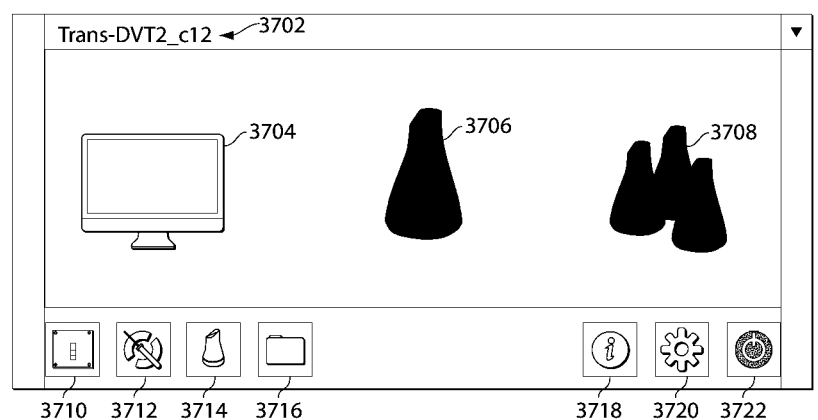
FIG. 37 shows a main user interface screen for the storage client application (which may be referred to herein as the "Connected Desktop"), in accordance with one exemplary embodiment.

FIG. 37 shows a main user interface screen for the storage client application (which may be referred to herein as the "Connected Desktop"), in accordance with one exemplary embodiment. Among other things, this screen includes a window 3702 displaying a representation of a client computer 3704, a representation of a particular transporter 3706, and representations of other transporter(s) 3708. In this window show is displayed activity information between the host application (the computer) and the various storage appliances, i.e., various arrows will show up to let the user know that data is flowing between the appliances/clients. The screen also includes various control and status icons 3710-3722. The "preference" button 3710 is used to open a preferences dialog page (discussed below). The "manage your account" button 3712 is used to launch the web browser to take the user to the central service user interface. The "transporter" button 3714 brings up a dialog that shows the user what files are being transferred to/from the storage appliance. The "folder" button 3716 shows all of the containers that are available and lets the user open up a "finder" window on them. The "info" button 3718 opens an "About Connected Data" dialog that displays the version and other application information. The "gear" button 3720 allows the user to check for updates and access debugging logs. The "power" button 3722 allows the user to quit the application.

Figure 38:
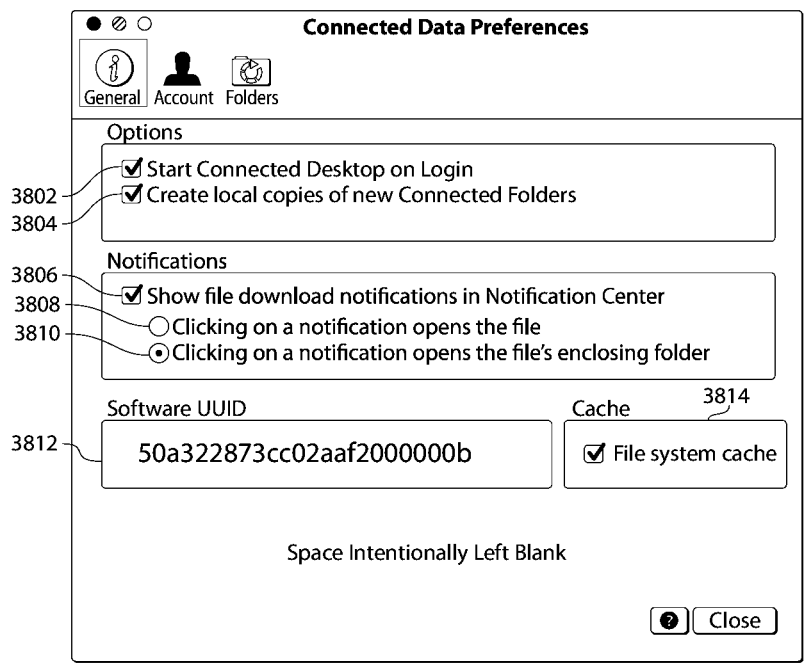
FIG. 38 shows an exemplary user interface screen that is displayed after the user has selected the "preferences" icon 3710 in FIG. 37 and selects the "general information" tab at the top of the window.

FIG. 38 shows an exemplary user interface screen that is displayed after the user has selected the "preferences" icon 3710 in FIG. 37 and selects the "general information" tab at the top of the window. From this screen, the user can configure via the checkbox 3802 whether or not the Connected Desktop application is started automatically at login. The user also can configure via checkbox 3804 whether or not new Connected Folders are cached locally (the default is to cache newly created folders locally). The user also can configure via the checkboxes 3806-3810 how notifications are handled, e.g., whether or not file download notifications are shown in the Notification Center, and if notifications are shown, whether or not clicking on the notification opens the file or the file's enclosing folder. The user also can configure via checkbox 3814 whether or not operating system caching of the file system is enabled, if the operating system offers such caching. The screen also displays the Software UUID in window 3812.

Figure 39:
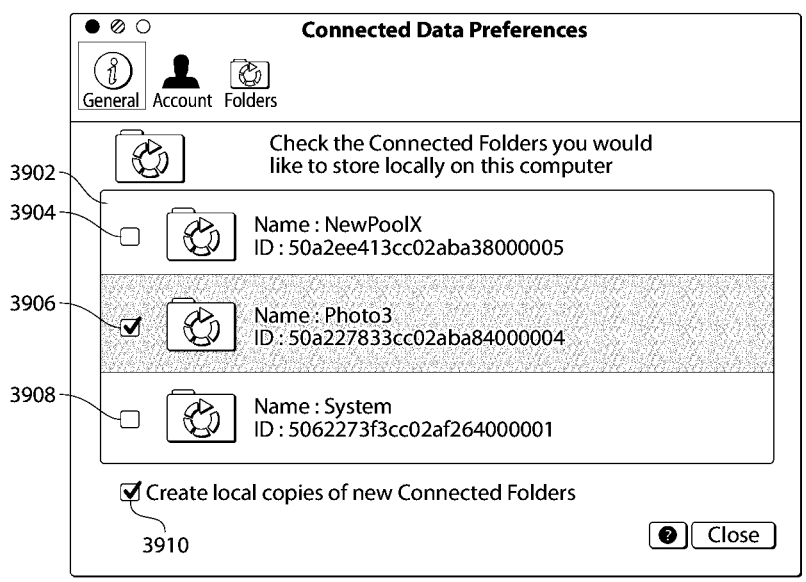
FIG. 39 shows an exemplary user interface screen that is displayed after the user has selected the "preferences" icon 3710 in FIG. 37 and selects the "folder" tab at the top of the window.

FIG. 39 shows an exemplary user interface screen that is displayed after the user has selected the "preferences" icon 3710 in FIG. 37 and selects the "folder" tab at the top of the window. This screen includes a window 3902 that lists the existing folders (in this example, three folders) and for each folder the user can configure via the corresponding checkbox 3904-3908 whether the folder is stored locally on the computer (i.e., with the checkbox checked as for the folder named "Photos") or is accessed remotely (i.e., with the checkbox unchecked as for the folders named "NewPoolX" and "System"). The user also can configure via checkbox 3910 whether or not new Connected Folders are cached locally (the default is to cache newly created folders locally).

It should be noted that, in certain embodiments, whether a container is locally cached or remotely accessed, a local copy of the contents of the container (or of just one or more files from the container) may be stored at least temporarily on the client computer such as for caching or while working on the file in a word processor or other application.

It also should be noted that, in certain embodiments, the client computer may be linked to the storage appliance such that when data is stored on the client computer (e.g., in a folder), the data is automatically pushed to a corresponding container on the storage appliance, which in turn would then cause distribution of the data to any other storage appliances that share the container.

It should be noted that alternative embodiments of the Connected Desktop application may provide for user-to-user messaging. For example, the user interface may providing a messaging screen through which a user can enter a message and also designate the recipient(s) for the message, and any such messages may be propagated by the user's storage appliance to the designated recipient(s), which in some cases may involve direct peer-to-peer communications between storage appliances, in some cases may involve communication between the user's storage appliance and the central service, or in some cases may involve communication directly over the Internet or other network exclusive of the storage appliance and central service. Such messaging may be particularly useful for collaboration among users, which is discussed below.

L. Storage Appliance Architecture

Figure 15:
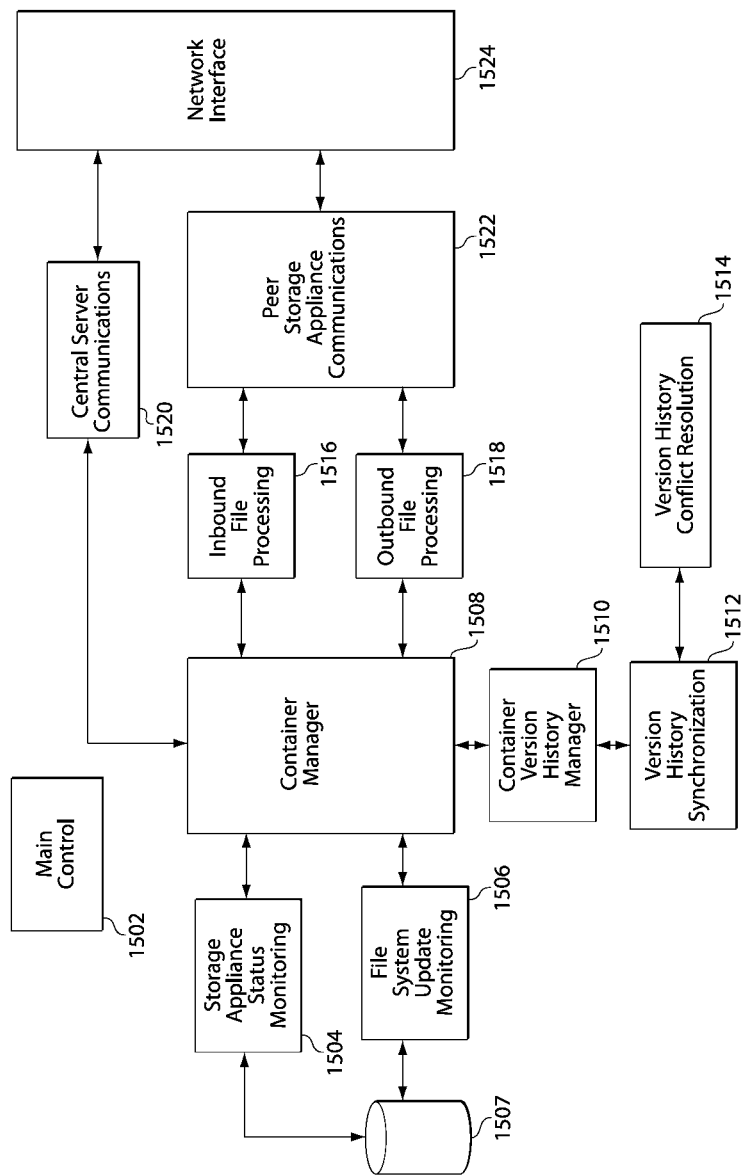
FIG. 15 is a schematic block diagram showing the storage appliance architecture in terms of actual or logical processes implemented in the storage appliance, in accordance with one exemplary embodiment.

FIG. 15 is a schematic block diagram showing the storage appliance architecture in terms of actual or logical processes implemented in the storage appliance, in accordance with one exemplary embodiment. Among other things, the storage appliance processes include a Main Control process 1502, a Storage Appliance Status Monitoring process 1504, a File System Update Monitoring process 1506, a Container Manager process 1508, a Container Version History Manager process 1510, a Version History Manager process 1512, a Version History Conflict Resolution process 1514, an Inbound File Processing process 1516, an Outbound File Processing process 1518, a Central Server Communications process 1520, a Peer Storage Appliance Communications process 1522, and a Network Interface 1524 that is coupled to a communication network to allow for communication between the storage appliance and the central service and also to allow for communication between the storage appliance, peer storage appliance(s), and storage client(s). The Storage Appliance Status Monitoring process 1504 and the File System Update Monitoring process 1506 are in communication with one or more disk drives (which may be internal to the storage appliance and/or external to the storage appliance).

The Main Control process 1502 is the top level control process that starts all the other processes. The Container Manager process 1508 is the central process that manages all container-related functions. The Storage Appliance Status Monitoring process 1504 is the overall health monitor process that manages the hardware and disk drive(s). The Central Server Communications 1520 process is the process that manages all communications between the storage appliance and the central service. The Peer Storage Appliance Communications process 1522 is the process that manages all communications between this storage appliance and peer storage appliance(s) and storage client(s). The File System Update Monitoring process 1506 is the process that monitors any changes to the local disk drive(s). The Inbound File Processing process 1516 is the process that handles new files sent from another peer storage appliance/client. The Outbound File Processing process 1518 is the process that handles sending files to another peer storage appliance/client. The Container Version History Manager process 1510 is called by the Container Manager 1508 to check the container version history for all peer storage appliance(s) and storage clients. There is separate version history for each container. The Version History Synchronization process 1512 is called following any new peer version history update, where this process checks the new history to determine if there are any changes (adds, deletes, modifies) that need to be performed on the container's files and, if so, performs the required changes. The Version History Conflict Resolution process 1514 is called by the Version History Synchronization process 1512 to resolve any conflicts between the local container files and the files on the peer storage appliance/client; this process changes the data in the containers for all peers, such that it is consistent on all storage appliances.

Figure 16:
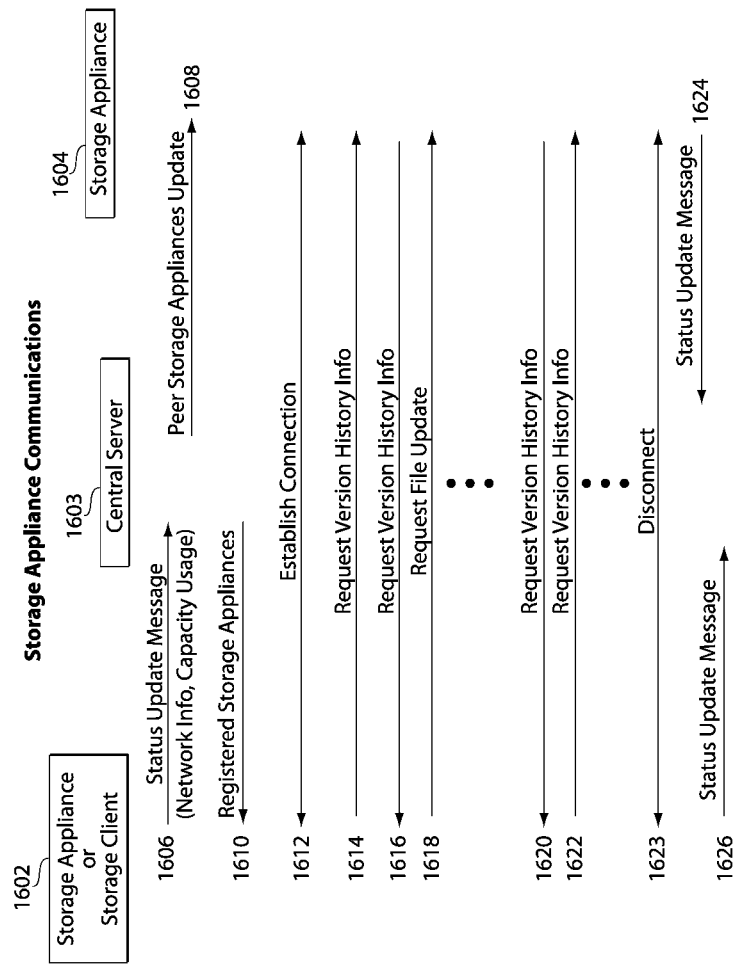
FIG. 16 is a schematic diagram illustrating logical processes in peer-to-peer communication between a first Storage Appliance or Storage Client and a second Storage Appliance, similar to the processes shown and described with reference to FIG. 12.

FIG. 16 is a schematic diagram illustrating logical processes in peer-to-peer communication between a first Storage Appliance or Storage Client 1602 and a second Storage Appliance 1604, similar to the processes shown and described with reference to FIG. 12. In this example, the SA 1602 send a status update message 1606 to the central server 1603, e.g., to request network information, capacity usage information, and the like. The central server 1603 sends a peer storage appliances update message 1608 to the SA 1604 and also sends a registered storage appliances message 1610 to the SA 1602, where these messages contain sufficient information to allow the SA 1602 and SA 1604 to establish peer-to-peer communications with one another, e.g., to synchronize files. Thereafter, a communication connection 1612 is established between SA 1602 and 1604 using typical connection establishment protocols (e.g., TCP or UDP-based communications), and the SAs 1602 and 1604 can then exchange and synchronize files through a series of message exchanges that include requesting and obtaining file version history information from one another (represented by messages 1614 and 1616) and performing a file update if necessary (represented by message 1618). These handshakes can be repeated for each file that is shared by the two SAs, e.g., as represented by messages 1620 and 1622. When all shared files have been updated, the connection is disconnected 1623. Each SA 1602 and 1604 sends a status update message 1626 and 1624, respectively, to the central server 1603 to inform the central server 1603 that the files have been updated.

M. Central Service User Interface

Various exemplary aspects of the user interface managed by the central server are now shown and described with reference to FIGS. 17-34, which are exemplary screen shots of various user interface screens.

Figure 17:
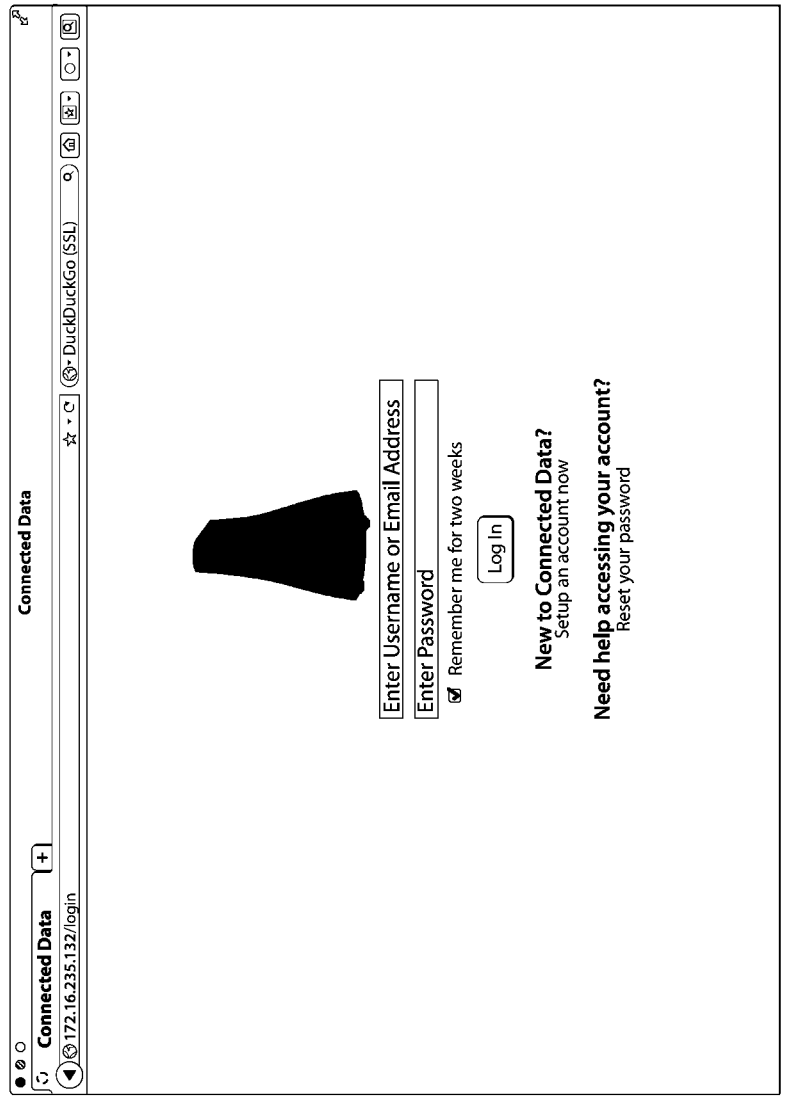
FIG. 17 shows a main user interface screen from which a user can log into an existing account or create a new account.

FIG. 17 shows a main user interface screen from which a user can log into an existing account or create a new account.

Figure 18:
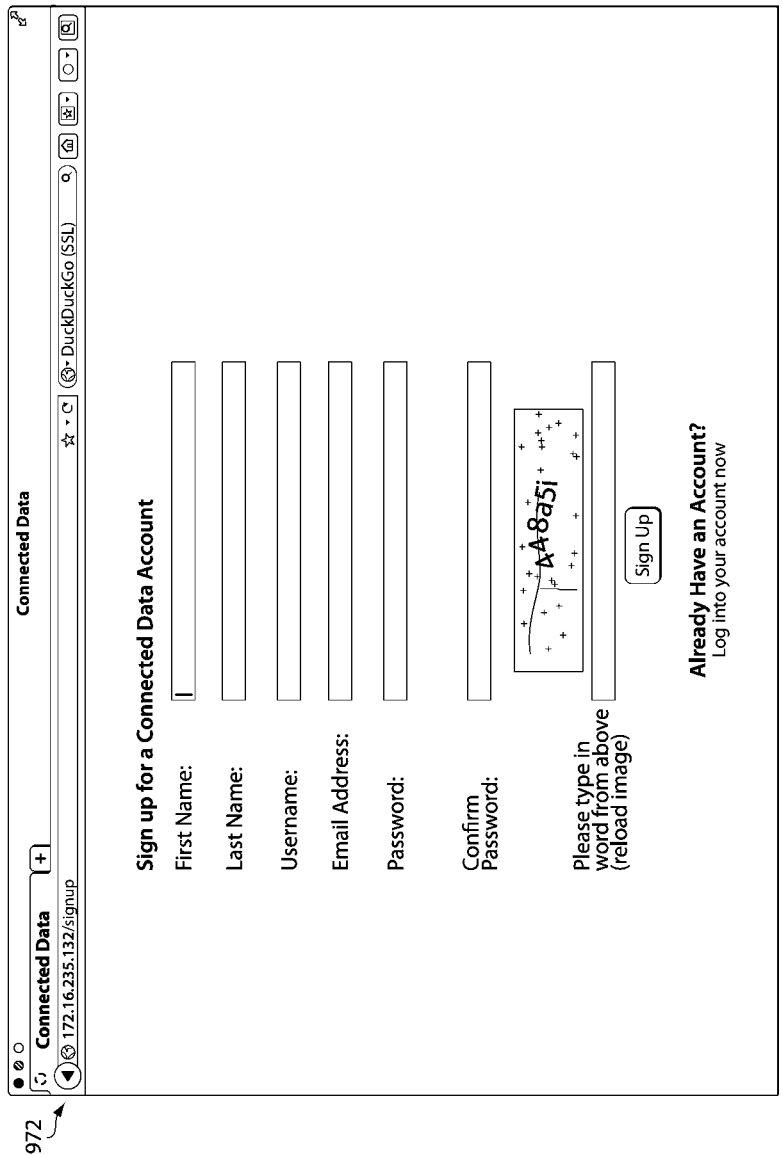
FIG. 18 shows a user interface screen for a user to create a new account.

FIG. 18 shows a user interface screen for a user to create a new account. Among other things, the user enters his or her first name, last name, self-appointed username (which can be used in various storage-related transactions), email address, self-selected password (with confirmation of same), and enters the "challenge" information that is used to prevent (or at least deter) computerized systems from creating user accounts.

Figure 19:
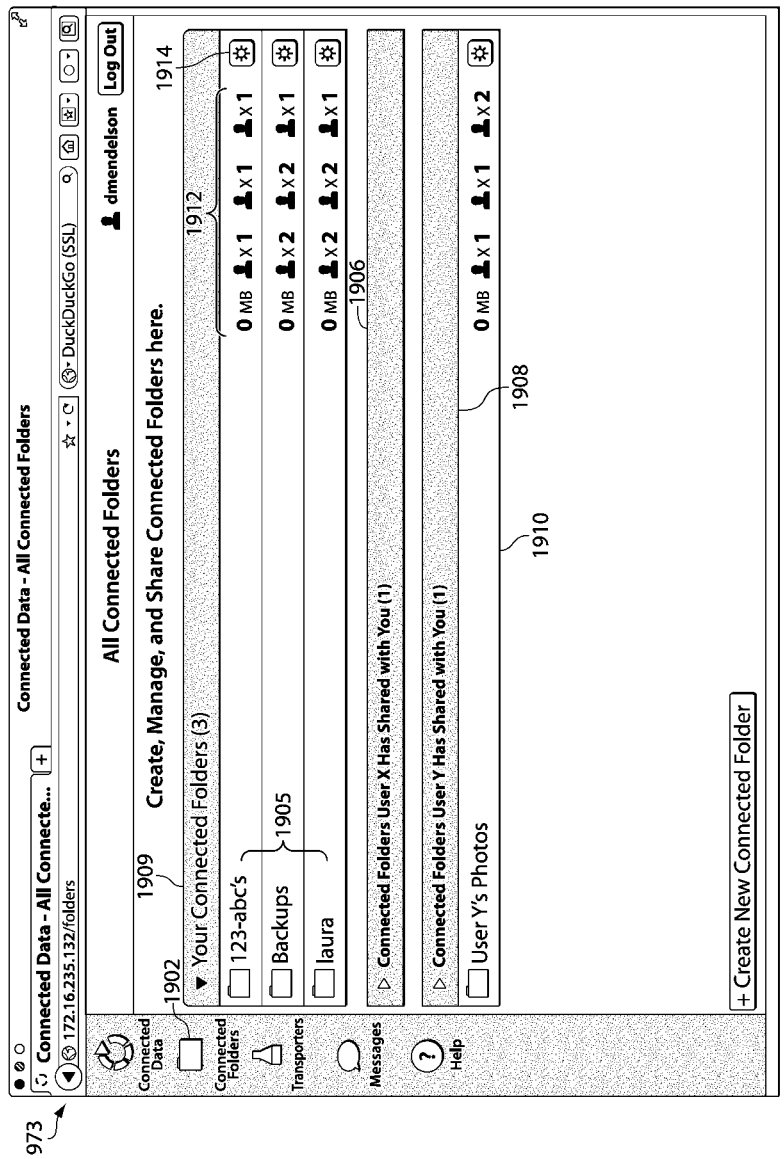
FIG. 19 shows a user interface screen showing all connected folders of a user's account, such as might be displayed when the user selects the "Connected Folders" icon.

FIG. 19 shows a user interface screen showing all connected folders of a user's account, such as might be displayed when the user selects the "Connected Folders" icon 1902. In this example, three sets of folders are displayed, specifically the user's own connected folders 1904, connected folders that a User X has shared with the user 1906, and connected folders that a User Y has shared with the user 1908. In each of the displayed lines 1904, 1906, and 1908, the number of folders in each category is shown in parentheses, i.e., line 1904 shows that there are three related folders, line 1906 shows that there is one related folder, and line 1908 shows that there is one related folder. For each line, the user can choose to "expand" or "collapse" the folder list, i.e., by clicking on the triangular icon. In this example, the folder list for line 1904 is expanded to show the three folders 1905, the folder list for line 1906 is collapsed, and the folder list for line 1908 is expanded to show the one folder 1910. For each displayed folder in an expanded folder list, there is a set of information 1912 including, from left to right, the size of the folder, the number of storage appliances on which the user is storing the folder, the total number of storage appliances that are storing the folder, and the number of users who are sharing the folder (including the user himself/herself). In this exemplary embodiment, each folder name (1905) is a hyperlink to the detail page (see FIG. 25 and related text) such that clicking on the folder names opens the detail page. Also, for each displayed folder in an expanded folder list, there is a pull-down menu 1914 that gives the user access to various folder-related functions.

Figure 20:
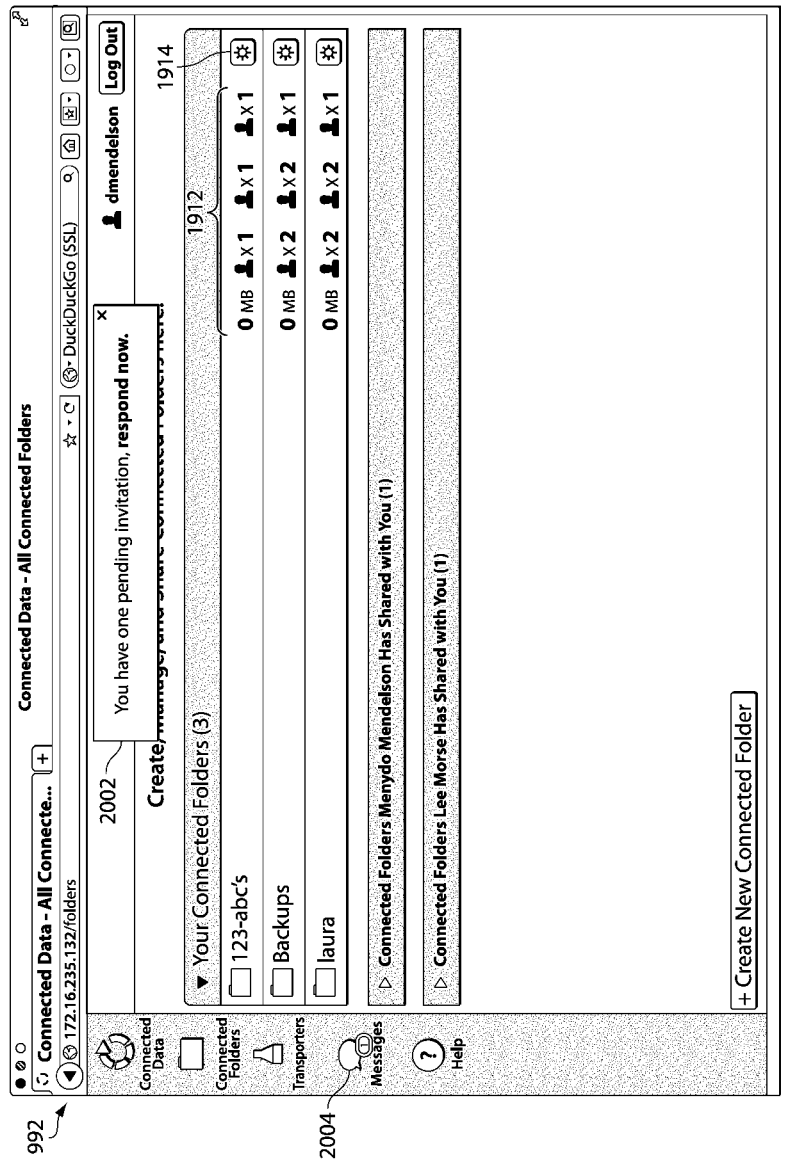
FIG. 20 shows a user interface screen similar to the one shown in FIG. 19, but here including a display indicating that the user has a pending invitation from another user.

FIG. 20 shows a user interface screen similar to the one shown in FIG. 19, but here including a display 2002 indicating that the user has a pending invitation from another user. The display 2002 may be transitory (i.e., it might be shown for a few seconds and then disappear), but the "Messages" icon 2004 displays the number of pending invitations so that, even when the display 2002 is gone, the user can still see that there is a pending invitation that requires his or her attention. The user can click on the "Messages" icon 2004 (and, in some embodiments, additionally can click on the display 2002) to see the pending invitations.

Figure 21:
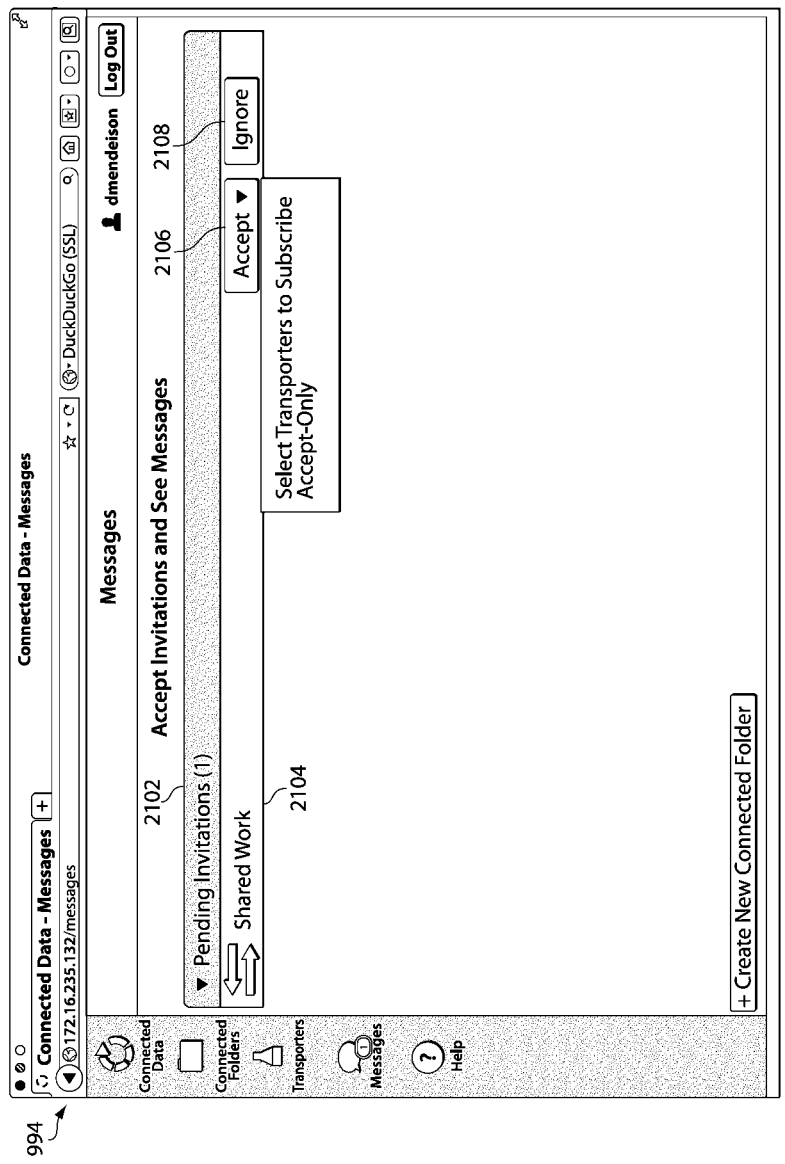
FIG. 21 shows a user interface screen showing messages for the user, such as when the user selects the "Messages" icon in FIG. 20.

FIG. 21 shows a user interface screen showing messages for the user, such as when the user selects the "Messages" icon 2004 in FIG. 20. In this example, there is a displayed line 2102 for pending invitations, although this display screen typically would include additional lines for other categories of messages, such as for emails or other messages sent via the storage system. As with the lines displayed in FIG. 19, the line 2102 includes a triangular icon by which the user can "expand" or "collapse" the list of pending invitations. Here, the list is expanded to show a pending invitation 2104 for "Shared Work." For each pending invitation, there is a set of icons 2106 and 2108 that allows the user to accept or ignore the invitation. The icon 2106 is a pull-down menu allowing the user to either accept the invitation and select storage appliances (referred to in this example as "Transporters") to subscribe, or accept the invitation without selecting storage appliances to subscribe. Thus, for example, the user could select the invitation and later assign one or more storage appliances for the "Shared Work" project.

Figure 22:
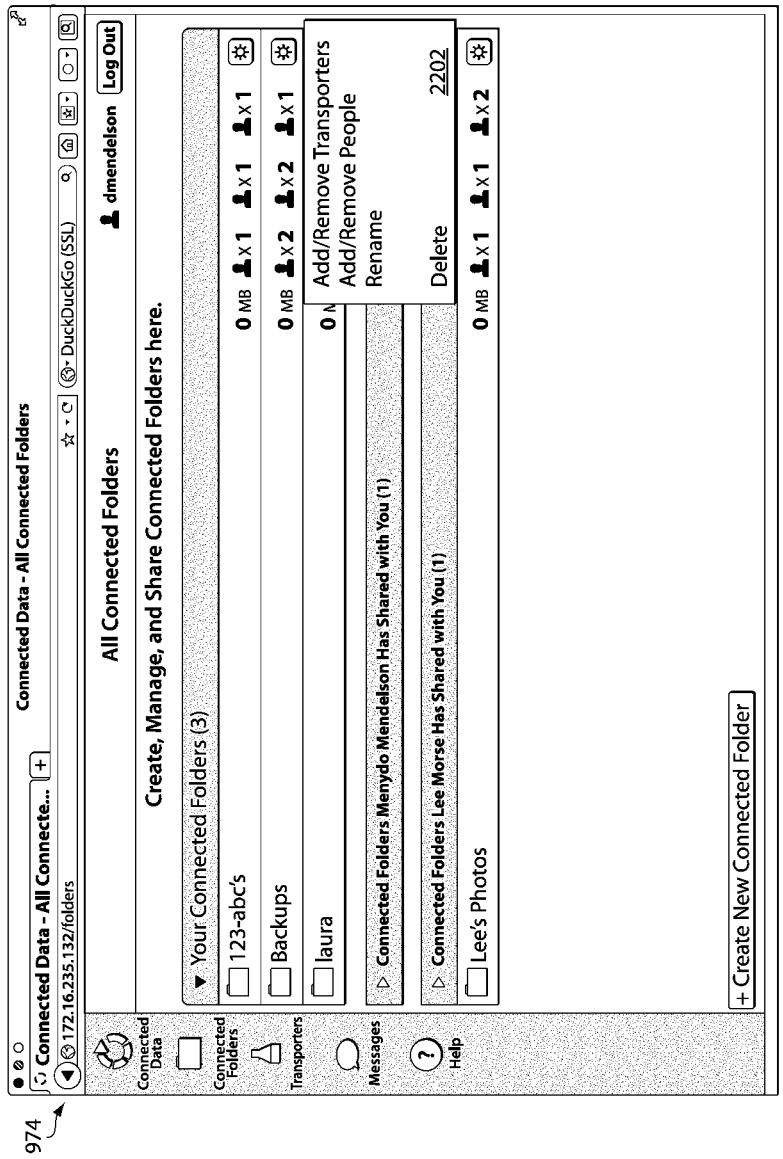
FIG. 22 shows a user interface screen after the user has selected the icon 1914 in FIG. 19 to display the pull-down menu 2202 for the "Backups" folder.

FIG. 22 shows a user interface screen after the user has selected the icon 1914 in FIG. 19 to display the pull-down menu 2202 for the "Backups" folder. In this example, the pull-down menu 2202 allows the user to add/remove storage appliances for the folder, add/remove people for the folder, rename the folder, or delete the folder.

Figure 23:
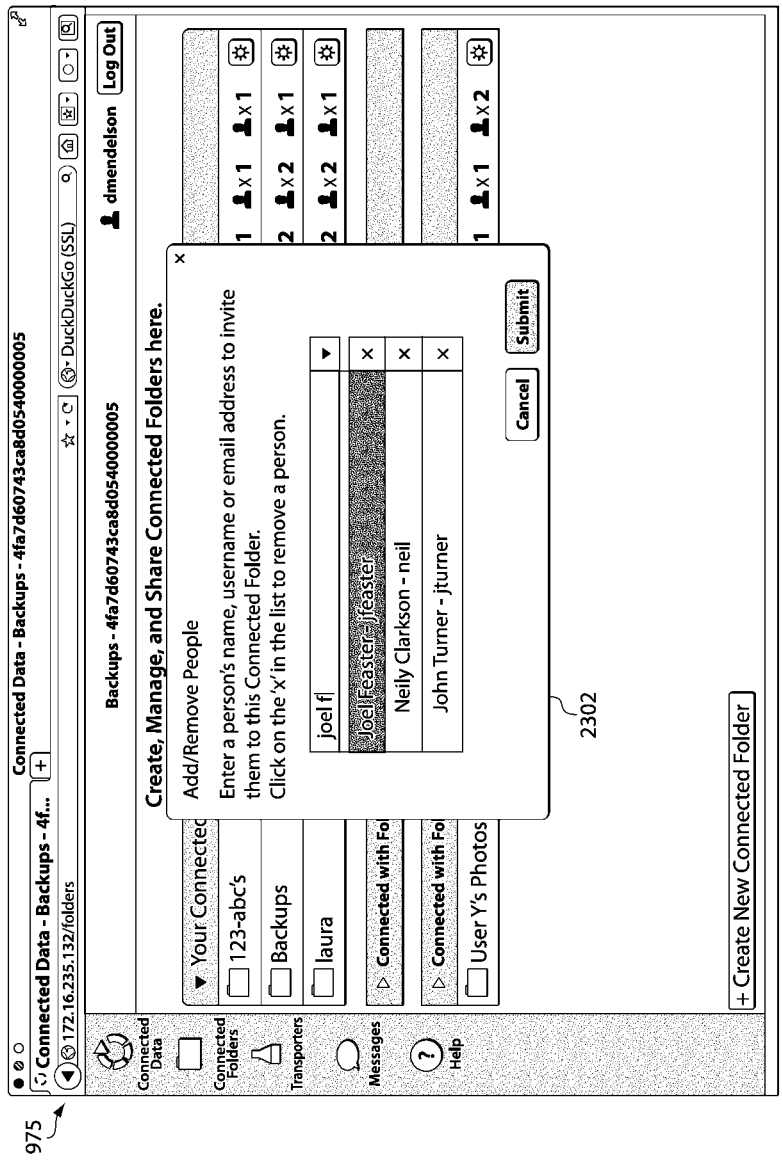
FIG. 23 shows a user interface screen after the user has selected "Add/Remove People" from the pull-down menu of FIG. 22 to display a window from which the user can add or remove people for the folder.

FIG. 23 shows a user interface screen after the user has selected "Add/Remove People" from the pull-down menu 2202 of FIG. 22 to display a window 2302 from which the user can add or remove people for the folder. In this example, the user has already added two names to the list for the folder and has begun typing in the name of a third user, and the system uses an "auto-fill" type mechanism to search for users matching the entered data and display the user(s).

Figure 24:
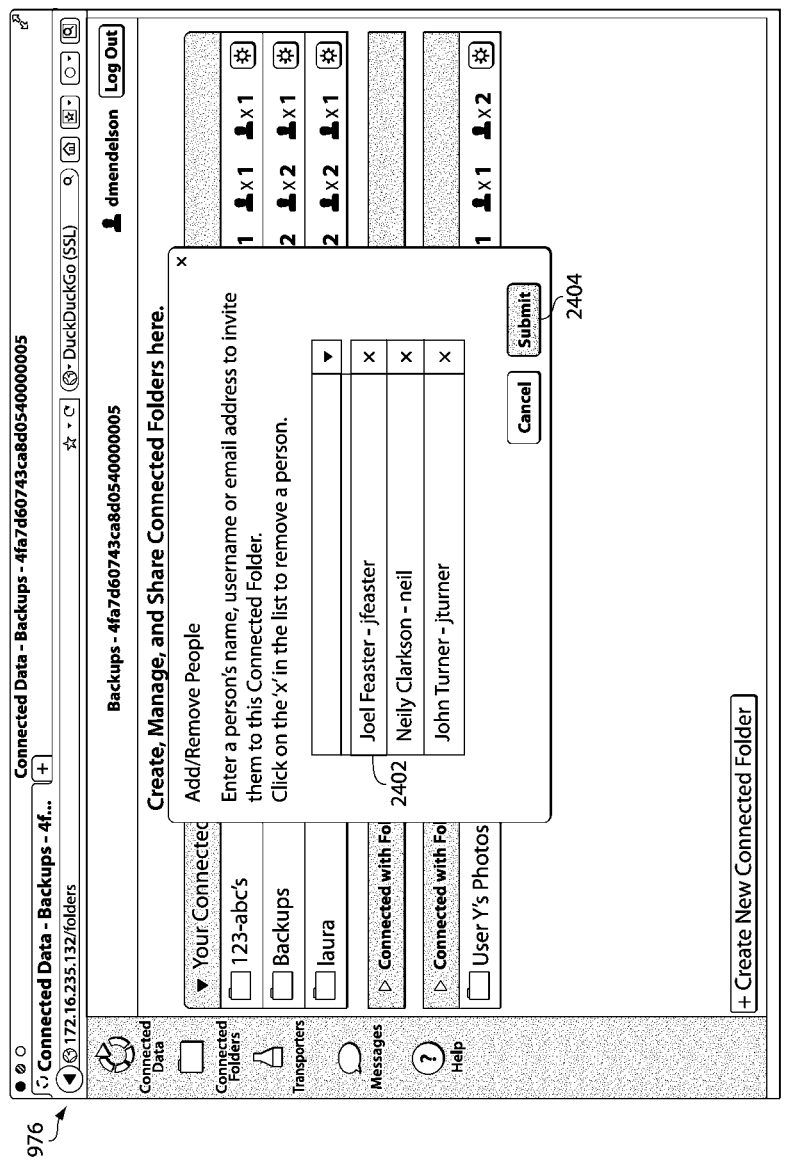
FIG. 24 shows the user interface screen of FIG. 23 after the third person 2402 has been added to the list of people for the folder.

FIG. 24 shows the user interface screen of FIG. 23 after the third person 2402 has been added to the list of people for the folder.

Figure 25:
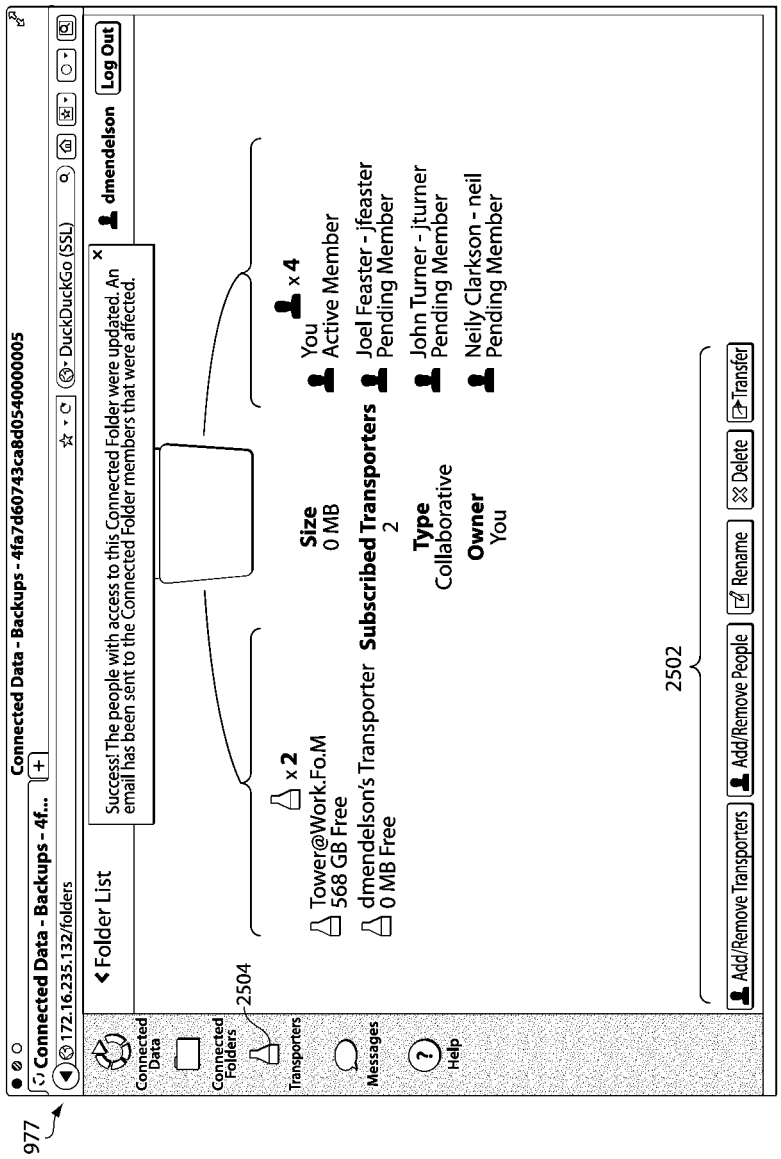
FIG. 25 shows a user interface screen that is displayed after the user selects the "Submit" button 2404 has been selected in FIG. 24, which adds the three new users to the folder and causes invitations to be sent to the three new users.

FIG. 25 shows a user interface screen that is displayed after the user selects the "Submit" button 2404 has been selected in FIG. 24, which adds the three new users to the folder and causes invitations to be sent to the three new users. The folder, which was previously used by one person (i.e., the user himself/herself), is now being used by four people. This screen also shows the two storage appliances that he or she is using to store the folder, the size of the folder, the number of subscribed storage appliances (referred to in this example as "Transporters"), the type of sharing (in this example, "Collaborative" sharing in which any user can add, change, or delete information from the folder), and the owner of the folder. This screen includes a set of icons 2502 that the user can use to perform additional functions for the folder, including add/remove storage appliances, add/remove people, rename the folder, delete the folder, or transfer ownership of the folder.

Figure 26:
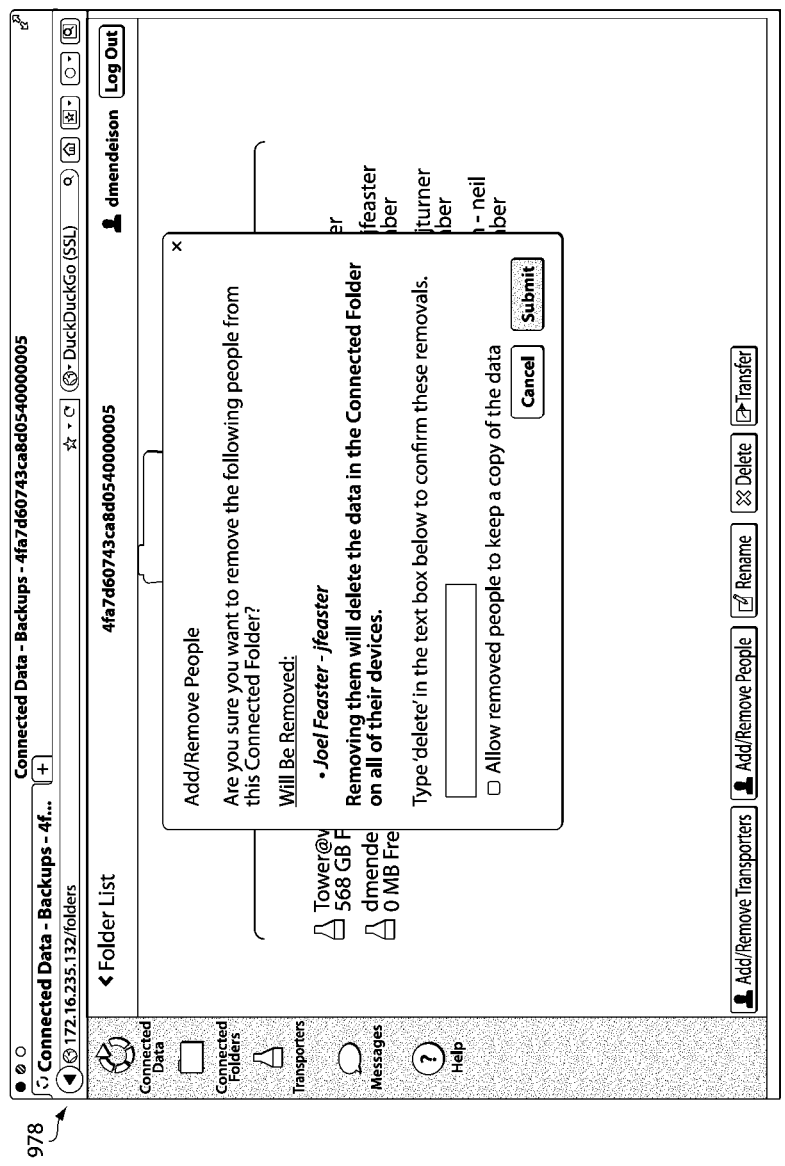
FIG. 26 shows a user interface screen including a window that is displayed when the user selects the "Add/Remove People" icon in FIG. 25.

FIG. 26 shows a user interface screen including a window that is displayed when the user selects the "Add/Remove People" icon in FIG. 25. From this window, the user can delete a user from the folder. In this example, the user is required to type the word "delete" to confirm that the person is being deleted. The window also includes a checkbox by which the user can specify whether the removed user can keep a copy of any already-shared data.

Figure 27:
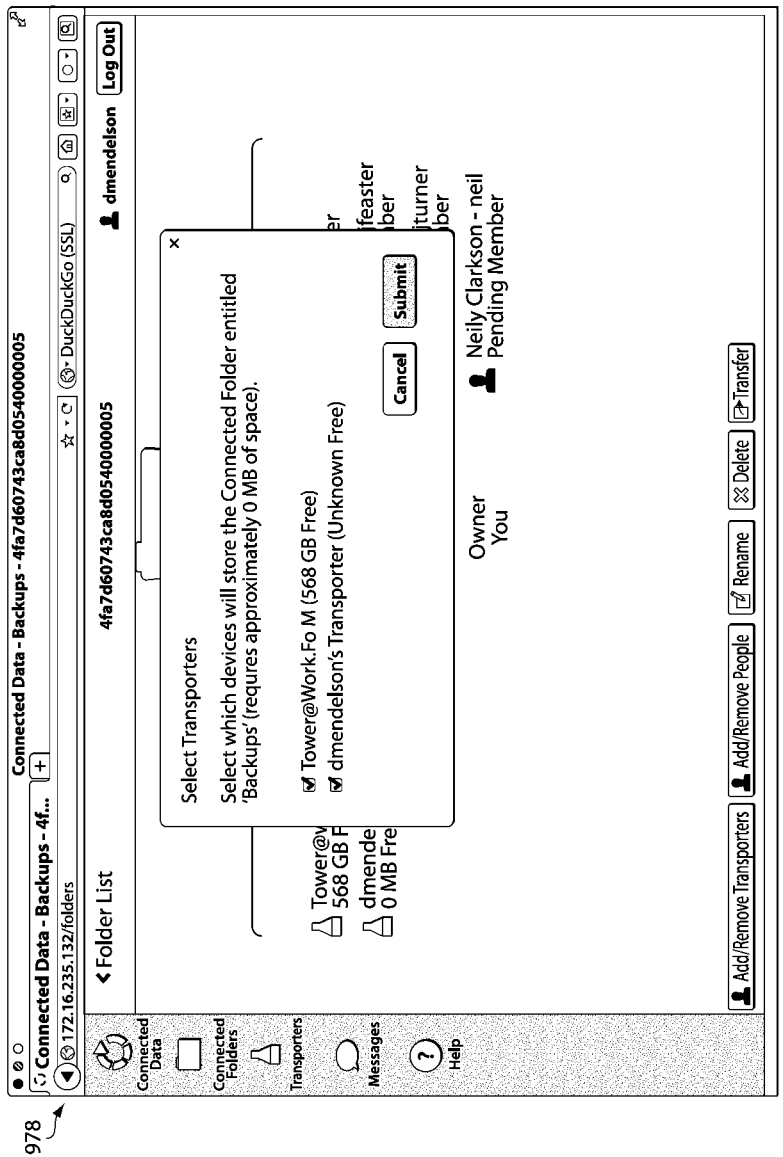
FIG. 27 shows a user interface screen including a window that is displayed when the user selects the "Transporters" icon 2504 in FIG. 25.

FIG. 27 shows a user interface screen including a window that is displayed when the user selects the "Transporters" icon 2504 in FIG. 25. From this window, the user can select which devices will store the folder.

Figure 28:
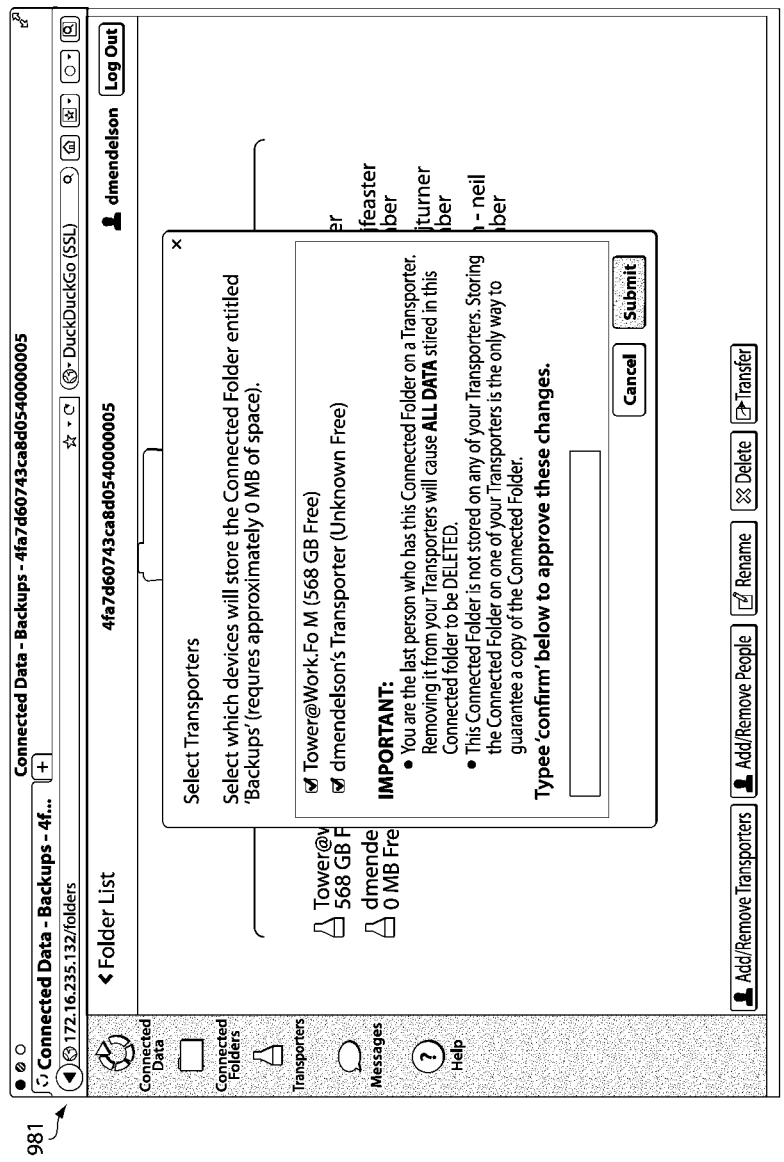
FIG. 28 is a user interface screen including a window that is displayed if the user selects no transporters to store the folder in FIG. 27.

FIG. 28 is a user interface screen including a window that is displayed if the user selects no transporters to store the folder in FIG. 27. This window includes a warning to indicate that removing all storage appliances from the folder will cause all data to be deleted, and also requires that the user enter the word "confirm" to confirm the configuration change.

Figure 29:
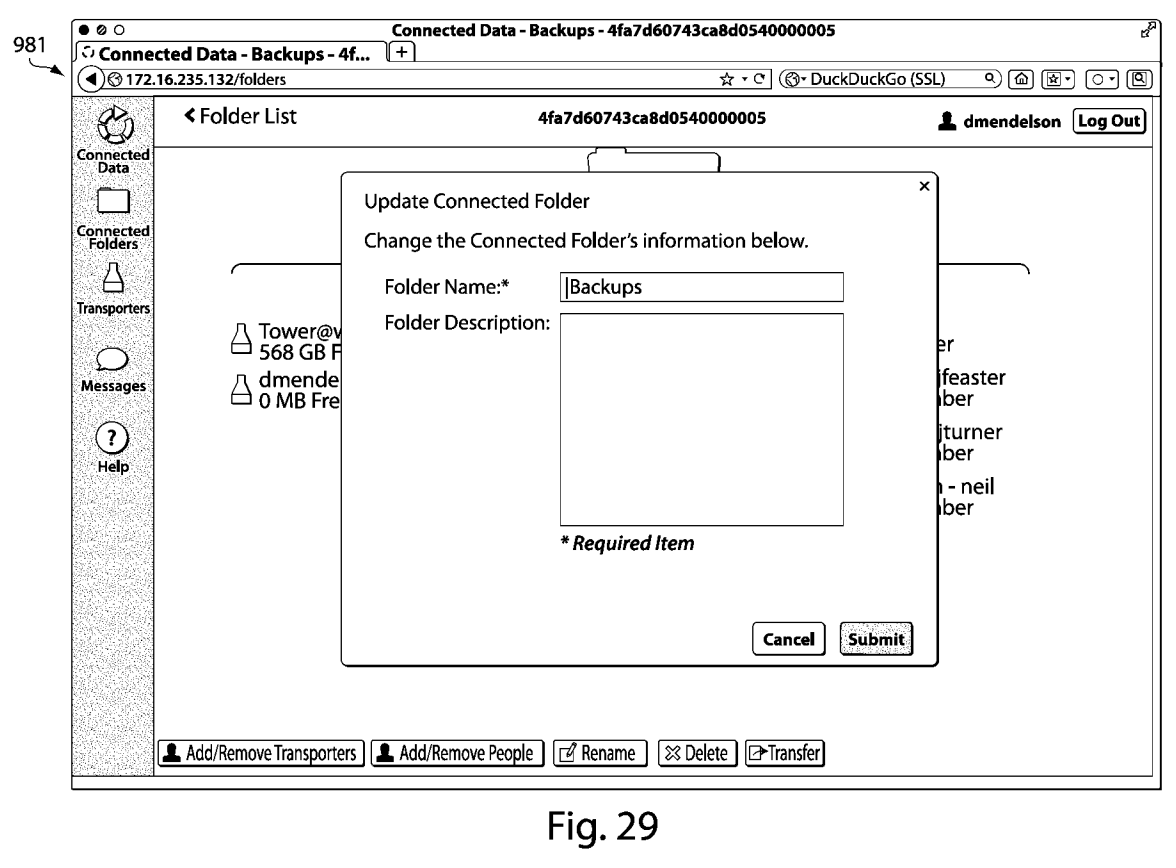

FIG. 29 is a user interface screen including a window that is displayed when the user chooses the "Rename" icon from the set 2502 in FIG. 25. This window allows the user to change the name of the folder and also to add an optional folder description.

Figure 30:
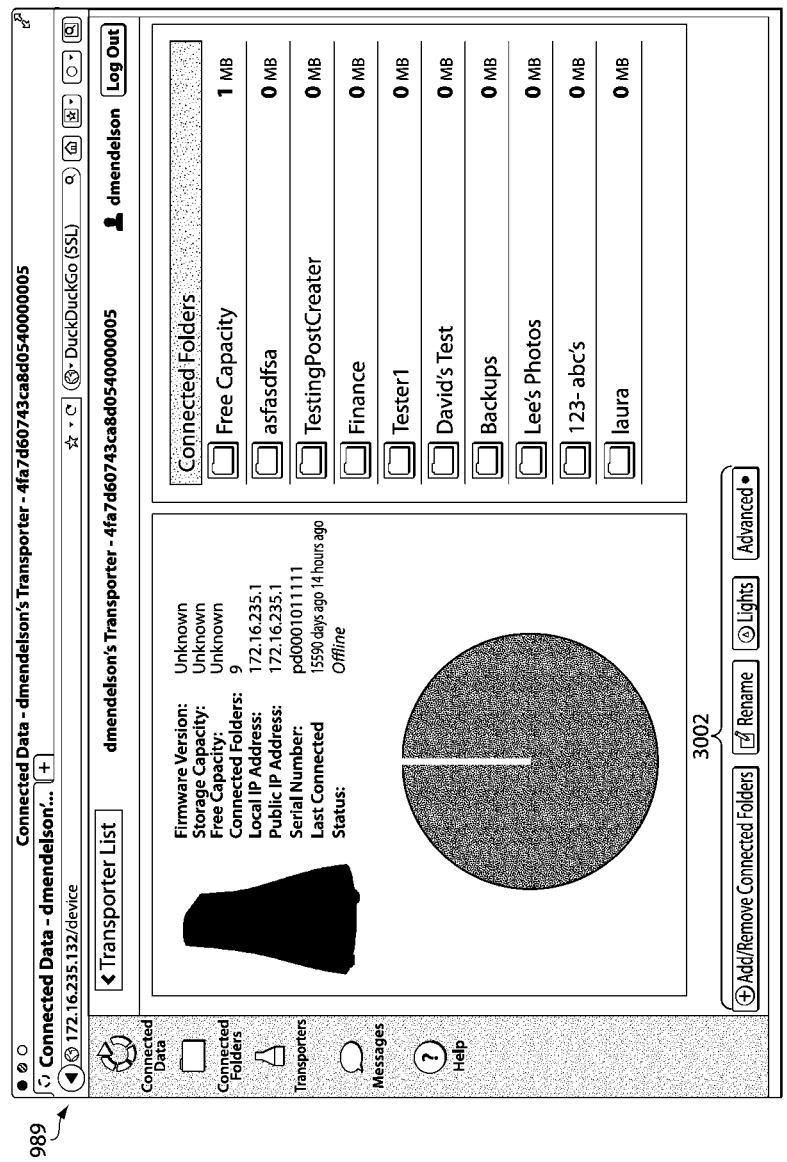
FIG. 30 shows a user interface screen including a window that is displayed when the user selects the "Transporters" icon 2504 in FIG. 25 and then selects one of his or her storage appliances.

FIG. 30 shows a user interface screen including a window that is displayed when the user selects the "Transporters" icon 2504 in FIG. 25 and then selects one of his or her storage appliances. This screen shows details for the selected storage appliance, including firmware version, storage capacity, free capacity, number of connected folders, local IP address, public IP address, serial number, last connected information, status, a graph showing the relative amount of used storage, and a list of the connected folders. Also includes is a set of icons 3002 that allow the user to add/remove connected folders, rename the storage appliance, view status indicators for the storage appliance ("referred to in this example as "Lights"), and perform other functions.

Figure 31:
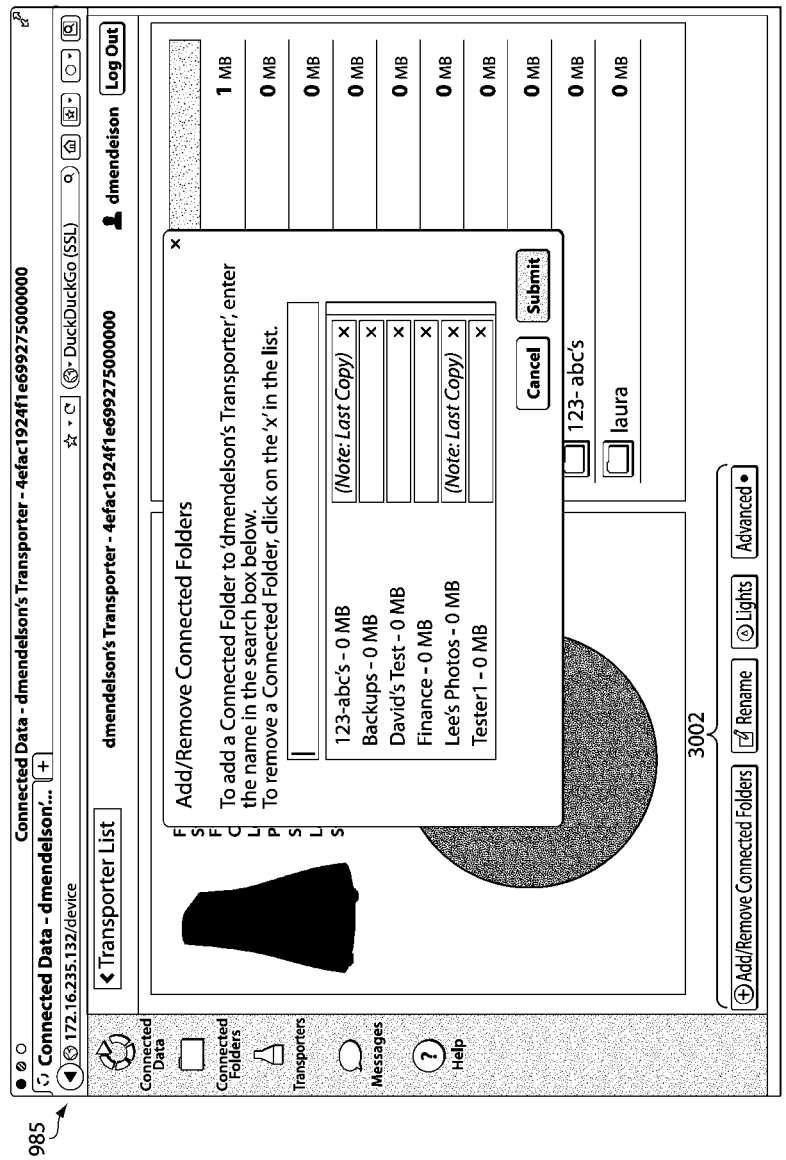
FIG. 31 shows a user interface screen including a window that is displayed when the user selects the "add/remove connected folders" from the set 3002 in FIG. 30.

FIG. 31 shows a user interface screen including a window that is displayed when the user selects the "add/remove connected folders" from the set 3002 in FIG. 30. This window allows the user to add or remove connected folders from the selected storage appliance.

Figure 32:
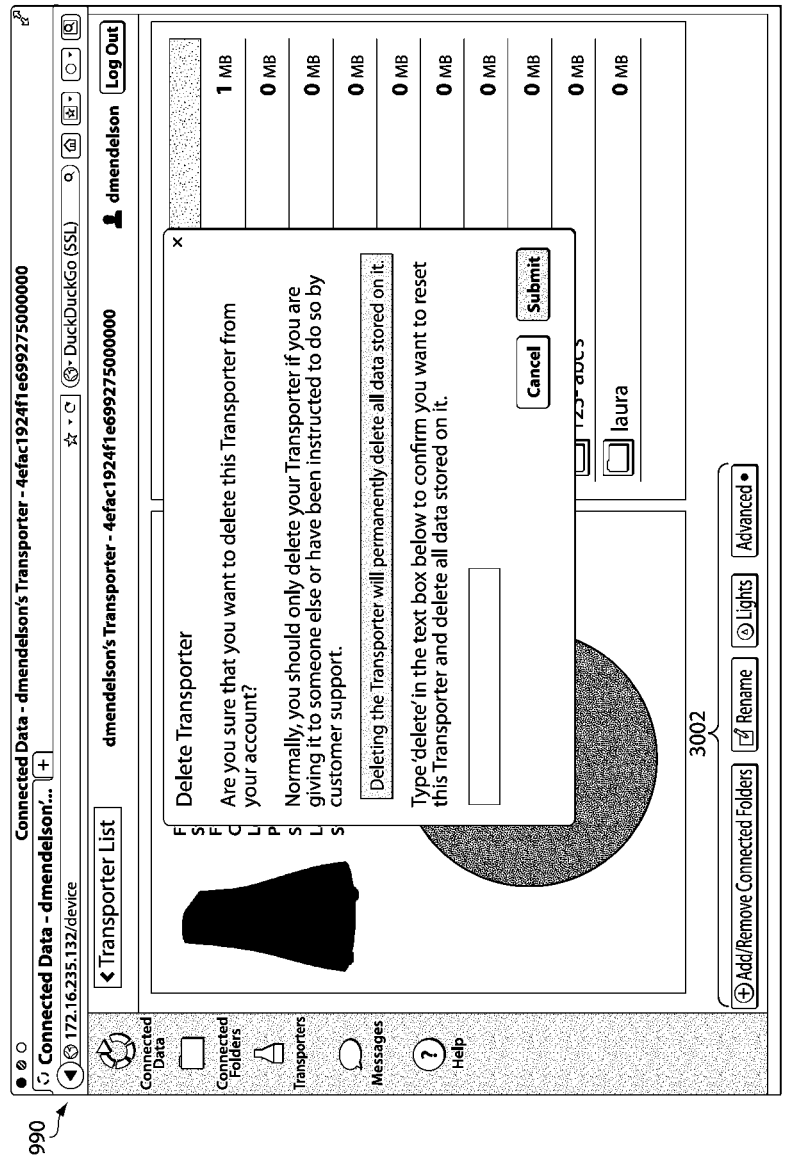
FIG. 32 shows a user interface screen including a window that is displayed when the user chooses to delete the storage appliance from his or her account, such as from the "Advanced" menu of the set 3002 in FIG. 30.

FIG. 32 shows a user interface screen including a window that is displayed when the user chooses to delete the storage appliance from his or her account, such as from the "Advanced" menu of the set 3002 in FIG. 30. In this exemplary embodiment, the 'Advanced' pull down menu currently has three functions that can be requested: Set Bandwidth limits, Enable Windows Sharing and Delete Appliance. The Bandwidth limits allow the user to limit how much bandwidth the storage appliance can use (default is 'Auto'). The Windows Sharing allows the user to access the storage appliance without using the client applications. Delete Appliance allows the user to 'un-claim' the storage appliance and let someone else claim it. This is generally used only if and when the user is giving the Appliance to a different person to use/own. The window displays a warning to the user regarding the effect of deleting the storage appliance and requires that the user enter the word "delete" to delete the storage appliance from the account.

FIG. 33 shows a user interface screen displaying information about the user and providing various controls to allow the user to update the information, manage email, set account preferences, and change password.

Figure 34:
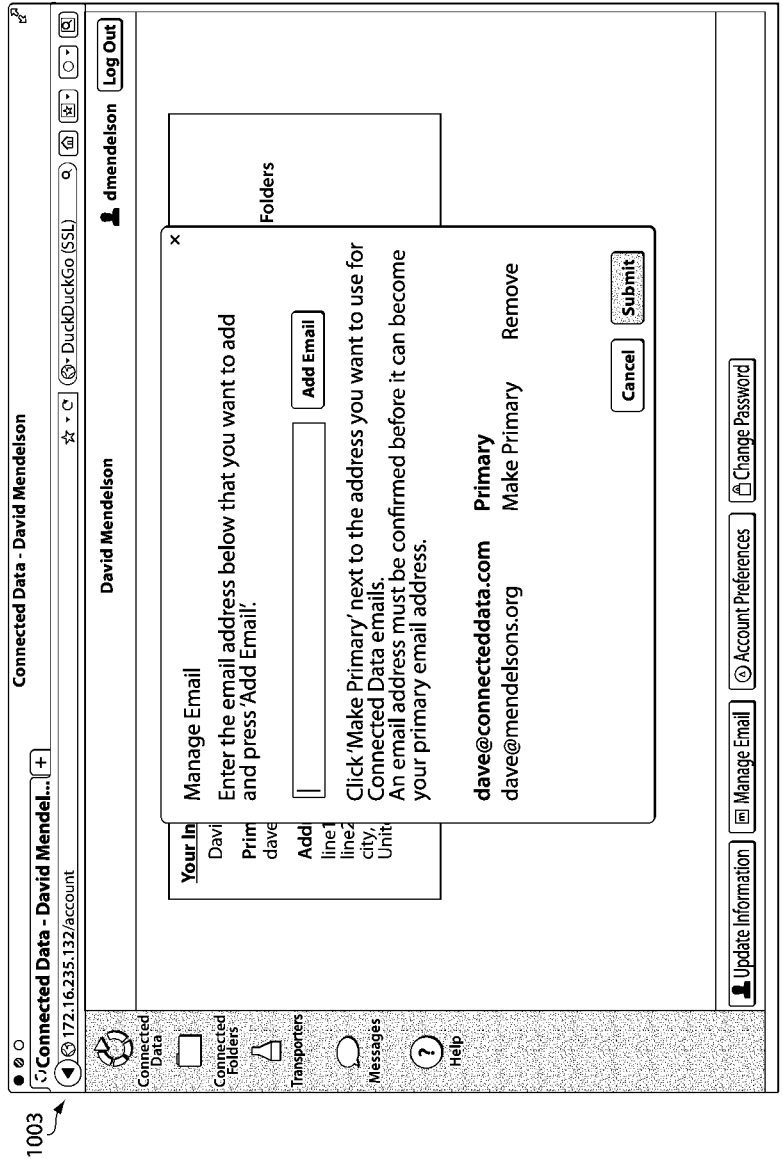
FIG. 34 shows a user interface screen including a window that is displayed when the user selects the "Manage Email" icon in FIG. 33.

FIG. 34 shows a user interface screen including a window that is displayed when the user selects the "Manage Email" icon in FIG. 33. From this window, the user can add an email address, and if multiple email addresses are specified, select which one is to be the primary email address for the account.

N. Socially Organized Storage

In some embodiments, the system is used for storing and organizing data that is shared among users (e.g. "socially organized storage"). A group of users may have access to the same virtual container. As users change the contents and/or organization of data in their respective local copies, the changes will be propagated to the local copies for all users in the group. Thus, whenever a member of the group accesses a local copy, the user will see a user interface that has been updated to reflect the changes collectively performed by the group. The contents of the container are therefore reorganized and evolve on a social basis.

As but one example of such socially organized storage, a group of friends may share music files in a virtual container named "Shared music." A user may create a folder named "relaxation music" and move eight files into it. The user's storage appliance automatically communicates the user's changes to the other group members' appliances, and the appliances change their local copies of the virtual container accordingly.

When another user accesses the virtual container, the user will see the "relaxation music" folder and its files. The user may edit the first user's classification of the music. For example, the user may create two subfolders within the "relaxation music" folder—"relaxing jazz" and "relaxing classical music." The user may move the jazz and classical music files into their corresponding files, and the user's storage appliance may communicate these changes to the other group members' appliances. When the first user next accesses the virtual container, the first user will see the edits made by the other user.

Other types of changes also will be propagated among the users' containers. For example, another user could rename the folder (e.g., from "relaxation music" to "quiet relaxation music"), add additional files into the folder, remove one or more files from the folder, change the name of a file, or make other changes to or within the container, and the appliances will communicate with one another to change their respective local copies of the virtual container accordingly.

As another example of such socially organized storage, a group of co-workers, e.g., at Acme Company, may share documents in a virtual container named "Acquisition of Beta Company." One user may create a folder named "Financials," and the user's storage appliance may instruct the other appliances in the group to create this folder on their local copies of the container. As the user receives documents regarding Beta Company's financials during the course of the transaction or encounters documents regarding Beta Company's financials in the container, the user may add or move the documents to the "Financials" folder. Such changes relating to the files and their organization are propagated to the other storage appliances in the group.

Another user may create a folder for "Employee compensation." The user may add copies of employment agreements for members of the executive suite, engineering departments, accounting department, marketing department, sales force, and administrative support. In some examples, the user may create subfolders corresponding to each of these categories to organize employment agreements by division. In some examples, the users may further create subfolders within the division folders for different levels of seniority, such as "department leaders," "mid-level managers", "staff," and "support." The user may further organize employment agreements within a division according to seniority. Such changes relating to the files and their organization are propagated to the other storage appliances in the group.

In some examples, a user may create a file named "Action items" and add the file to a root directory within the container. The file may be used to track tasks to complete for the acquisition. As the transaction progresses, a user may add tasks to the file as the group learns more about the target company's operations. Updates to the file's contents are sent to other users' storage appliances, thereby keeping the group members apprised of developments in the transaction. Further, as users complete tasks, they may update their local copies of the file to indicate which tasks have been completed and the results of their due diligence. Such changes to the file are sent to the group's' storage appliances.

In operation, users may belong to the same replication/synchronization (r/s) group. At least one of each user's storage appliance(s) may be linked to the same virtual container, and information about the link may be stored by the central service. Each user may have full access to the virtual container, e.g., each user may read and write to the virtual container, thereby changing the content and/or organization of folders and/or files therein. Additionally or alternatively, some users may have limited access to the virtual container, e.g., read-only access. When one user makes changes to a virtual container, the user's storage appliance may cause the other storage appliances that are also linked to the virtual container to make the same change to their local copies. Thus, changes to a virtual container may be propagated to all members of the replication/synchronization group.

In operation, in some embodiments, a user may edit the contents of a file in the virtual container. In some embodiments, a user may edit the organization of files in the virtual container's file system (e.g., the metadata of the file system). The user's storage appliance may determine that the virtual container is configured for socially organized storage. In one example, the virtual container may have a setting associated with socially organized storage. In another example, the virtual container's identifier may have a format that indicates the virtual container is configured for socially organized storage.

The storage appliance linked to the virtual container may send a request to the central service for information about other members of the replication/synchronization (r/s) group. The request may include the identifier of the virtual container, such as an identification number. In some implementations, the request may be a GetReplicationTargetsForContainer request.

In response, the central service typically sends identifying information for some or all the other storage appliances in the r/s group associated with the virtual container. In various embodiments, the identifying information may include a network address associated with a storage appliance and/or other identifying information.

The storage appliance stores the identifying information. The storage appliance instructs the other storage appliances in the r/s group to update data in their local copies of the virtual container, based on the user's changes. A particular storage appliance may communicate with all of the other storage appliances in the r/s group to propagate changes to all storage appliances, or the storage appliance may communicate with a subset of the storage appliances, each of which may in turn communicate with one or more other storage appliances in order to propagate changes to all storage appliances.

Using the identifying information for another appliance in the r/s group, the storage appliance can establish a connection with the other appliance. In some embodiments, the storage appliance can establish a secured and/or peer-to-peer connection. The storage appliance can send the other appliance a request to establish the connection.

Once the connection has been established, the storage appliance can instruct the other appliance to change data in its local copy of the virtual container. In various embodiments, the change can be a change to the Container change history information, a file version history, data in a file in the virtual container, metadata associated with files in the virtual container, or any combination thereof. The storage appliance can send the instruction in one message or over a series of messages. Each instruction can include a request for an acknowledgement from the other storage appliance. In some embodiments, when the sending storage appliance sends the instruction over multiple messages, the storage appliance can wait for an acknowledgement signal from the receiving appliance before sending the next message.

After the storage appliance receives an acknowledgement signal in response to the final message sent to another appliance, the storage appliance can repeat the same process with another appliance in the r/s group. When the storage appliance has finished instructing all other appliances in the group, the appliance optionally can send a message to the central service indicating that the virtual container's contents have been updated.

In some embodiments, the central service optionally may send a message (e.g., e-mail message) to each user in the r/s group regarding changes to the virtual container (such messaging may be configurable by the user). The central service may send the messages in response to receiving the message from a storage appliance that the virtual container's contents have been updated. In some embodiments, the owner or creator of the virtual container may configure the container such that messages are sent only regarding certain types of changes. For example, the central server may inform the users when the contents of files have been changed and when files have been re-organized.

Additionally or alternatively to notifying the central service when a virtual container's contents have been updated, one or more of the storage appliances may send a message (e.g., an e-mail message) to specific users to notify the users when a virtual container's contents have been updated and/or may provide a signal that allows the Connected Desktop application in the client's computer to generate a local indicator that the virtual container's contents have been updated.

Thus, certain embodiments of socially organized storage include one or more types of messaging, which may be coordinated through the central service or may be accomplished independently of the central service. Such messaging may include direct user-to-user messaging, such as to facilitate collaboration (e.g., a user may modify a file and send a message to another user asking that user to review the changes). Messages sent between storage appliances typically would use the similar types of communication mechanisms that are used for propagating changes made to the virtual container.

Figure 40:
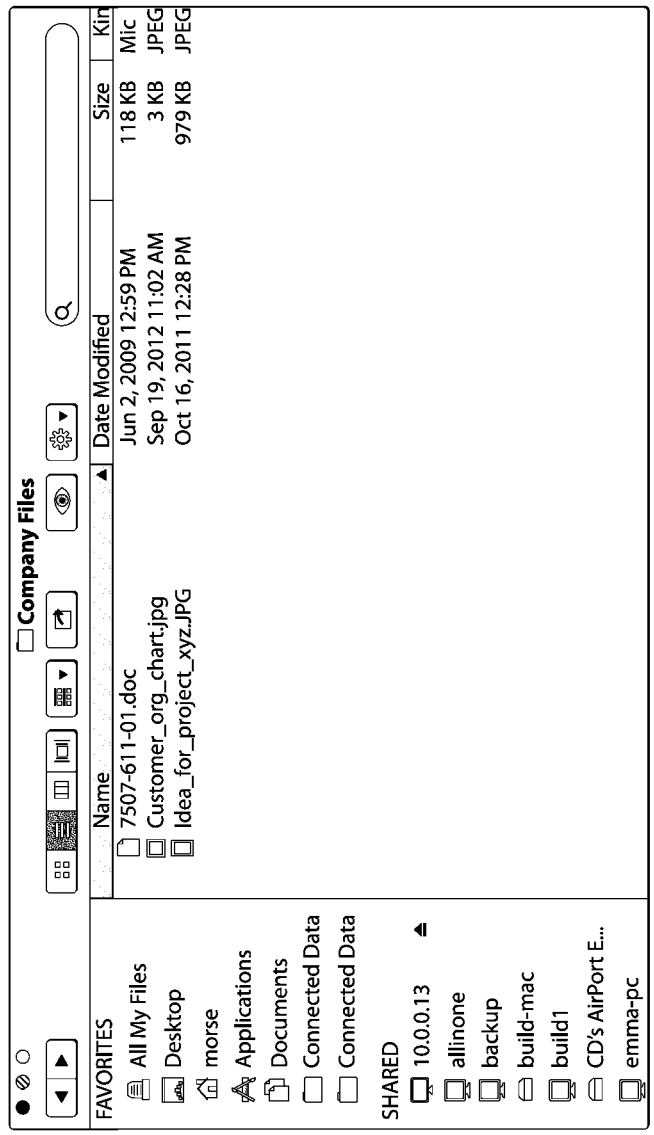
FIGS. 40-42 depict exemplary changes to user interfaces at storage appliances in a replication/synchronization group as contents are re-organized in a common virtual container, in accordance with an exemplary embodiment of socially organized storage.
Figure 41:
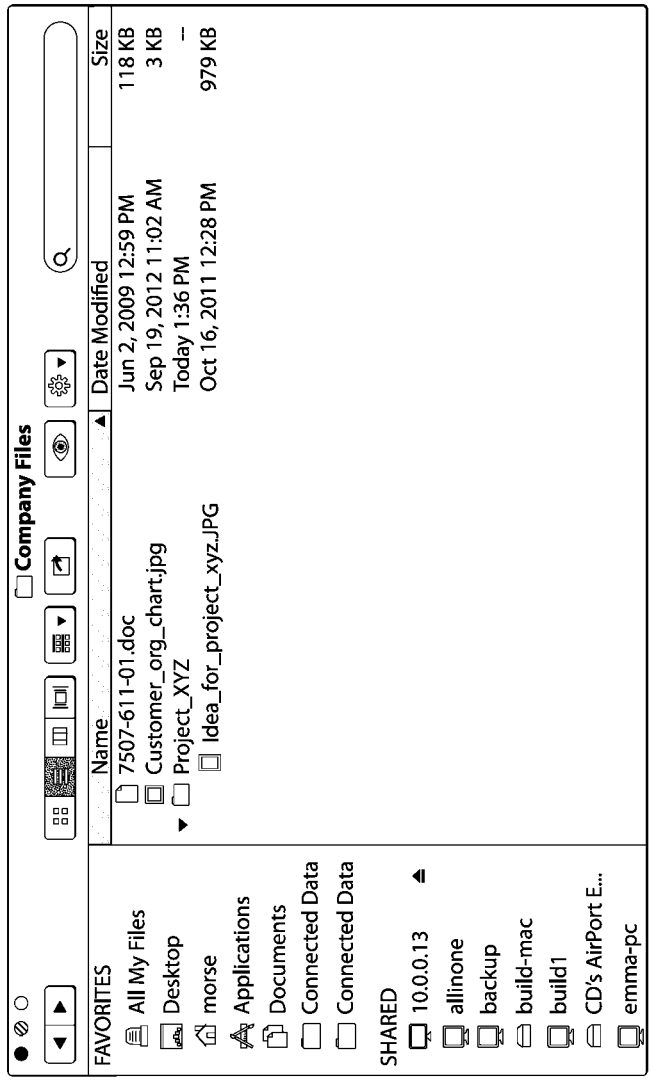
Figure 42:
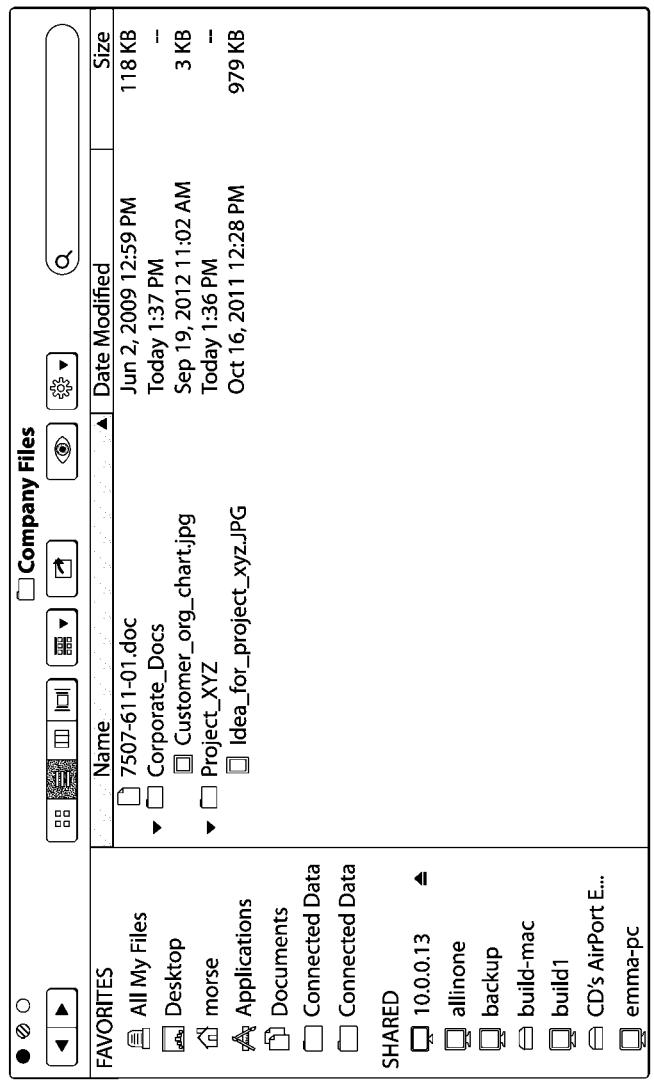

FIGS. 40-42 depict exemplary changes to user interfaces at storage appliances in a replication/synchronization group as contents are re-organized in a common virtual container. In this exemplary embodiment, the storage appliances are linked to a virtual container that has been titled "Company Files." In FIG. 40, the virtual container includes three files in the root directory. Typically, all users accessing the virtual container from their storage appliances will see the same user interface.

Referring now to FIG. 41, a user can create a folder named "Project XYZ" and move the file "Idea_for_project_xyz.JPG" to the folder. Based on the container's configuration, and in a manner transparent to the user, the user's storage appliance can determine that the virtual container is associated with a r/s group. To propagate the change in file organization to the other members of the group, the user's storage appliance can request the identifying information of the other members from the central service. For example, the storage appliance can send the central service a request with the virtual container's identifier. In response, the central service searches and finds the r/s group associated with the virtual container. The central service retrieves identifying information about the group's members and sends it to the user's storage appliance.

The user's storage appliance establishes a connection with another appliance in the group. The appliance sends the change in metadata corresponding to the file re-organization performed by the user. The receiving appliance changes the metadata in its local copy of the virtual container based the information from the user's appliance. The user's appliance repeats the process with other appliances in the group so that the changes are propagated to all storage appliances in the group. After all the appliances have updated their local copies of the virtual container, the users will also see the user interface depicted in the figure.

Referring now to FIG. 42, another user can create the folder "Corporate_Docs" and move the file "Customer_org_chart.jpg" into the folder. Similarly, that user's storage appliance can request the identifying information of other members of the Virtual container's r/s group from the central service. The storage appliance can instruct other members to change the metadata in their local copies according to the user's file re-organization.

It should be noted that the storage appliances, by virtue of their inherent synchronization and peer-to-peer communications capabilities, can be used generally for virtually any type of "store-and-forward" services in which data can be put into a container and automatically shared with one or more designated user. For example, the "store-and-forward" service can be used to effectively provide services equivalent to facsimile transmission, e-mail messaging, text messaging, invitation services (e.g., party invitations), etc., where a file placed in the container is automatically distributed to one or more other storage appliances as designated according to the relationship configuration. Furthermore, with proper device and network configuration, such "store-and-forward" service also can be used to accomplish essentially real-time data distribution, such as to effectively provide services equivalent to streaming audio, streaming video, telephone conferencing, video conferencing, webinar, etc., as updated data placed in the container is automatically distributed to one or more other storage appliances as designed according to the relationship configuration. Thus, for example, conference call or webinar could be established quickly and easily by inviting users to share a particular container and then causing data updates to be made to the container.

O. Sharing Access to Folders on Storage Appliances with Non-Owners

In some embodiments, the system allows users to access user data through storage appliances that they do not own. By leveraging other users' storage appliances, data is available to a user even when the user cannot access his or her own storage appliances or when they do not even own storage appliances. For example, a user may accidentally leave his or her storage appliance behind while traveling for business, but the user may connect remotely (e.g., over a wide area network such as the Internet) to someone else's storage appliance to view and/or edit contents stored in one of the appliance's physical containers. In another example, the user may take a day trip to his or her company's satellite office, where employees have connected their storage appliances to the company's local area network. Instead of packing his or her own storage appliance, the user may use one of the employees' storage appliances to edit contents in a work-related physical container.

Owners grant other users access to their storage appliances or particular physical containers on the appliances, and the central service stores the access grants. When a client application running on a user's computing device requests from the central service the list of folders (e.g., physical containers) and their associated storage appliance(s) that the user can access, the central service includes the storage appliances for which the other owners have granted the user access. If the user selects one of these storage appliances, the user's computing device then connects on a peer-to-peer basis to the selected storage appliance. Thus, after a storage appliance owner has granted a user access, the user can obtain user data from the storage appliance in a seamless manner.

Owners configure their accounts with the central service to share their storage appliances. In some embodiments, owners select particular folders on their storage appliances to share. Thus, when a user accesses the owner's storage appliance, the user can access the selected folder(s), but all other folders on the owner's storage appliance remain invisible. The owner also specifies the level of access (e.g., read/write, read only) for the folder(s). In other embodiments, owners share the storage appliances in their entireties. Thus, other users who access the owner's storage appliance may access all of the folders. In some embodiments, the owner specifies the level of access (e.g., read/write, read only) for each folder on his or her storage appliance. In some embodiments, owners do not share any of the folders on their storage appliances, but they allow other users to add files and/or folders. Thus, other users may not view the owner's files or folders, but they may use the owner's appliance to store additional files or folders. In these embodiments, the owner grants the other users a "write only" level of access to the storage appliances.

Owners designate the users who may access the virtual containers and/or storage appliances. In some embodiments, an owner designates a user by associating the user's identifier (e.g., identification number) with the virtual container or storage appliance. The owner designates registered users, unregistered users, or both. In further embodiments, an owner designates a group of users by making the association with the group identifier, instead. For example, the owner may grant access to a virtual container to all members of the container's replication/synchronization group. Thus, a user could access the virtual container on the owner's storage appliance only if the user could access the same container on his or her own appliance.

Figure 43:
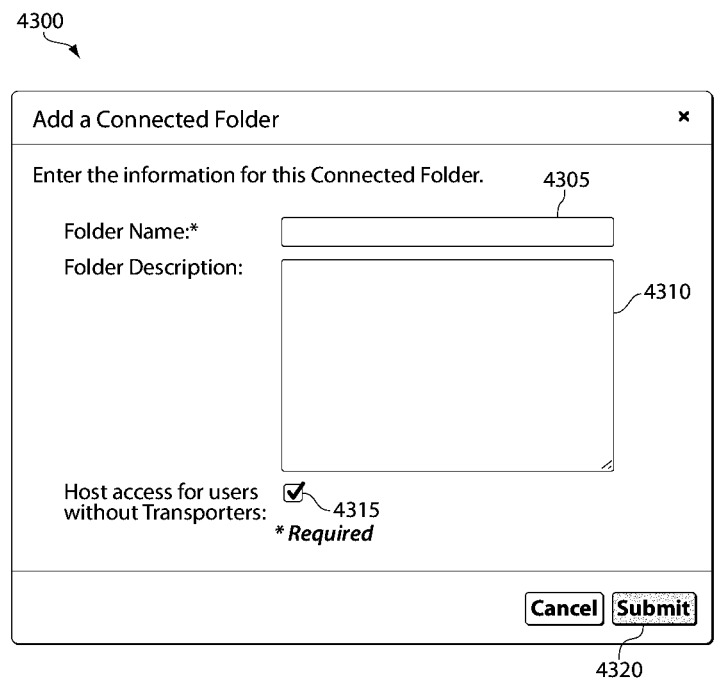
FIG. 43 shows a user interface screen displayed when a user creates a folder associated with a virtual container, including a control to enable sharing of the folder with users who do not own any storage appliances.

In some embodiments, when a storage appliance owner adds a folder to his or her appliance, the owner configures the folder to be shared on his or her appliance with non-owners. FIG. 43 is a user interface screen 4300 displayed when a user configures such a folder. In various embodiments, the client application executing on the user's computing device displays this user interface screen 4300 when the owner creates a virtual container. For example, the user may create a folder for the virtual container by selecting the "Create New Connected Folder" control on the user interface screens of FIG. 19, 20, or 22. In further embodiments, the client application displays this user interface screen 4300 when the owner accepts an invitation from another user to share an existing folder. For example, the user may accept an invitation by selecting the icon 2106 on the user interface screen of FIG. 21.

The user interface screen 4300 has a folder name field 4305 and a folder description field 4310. When the storage appliance owner creates a folder, the owner inputs its name into field 4305 and a description of the contents, purpose, or both of the folder into field 4310. In some embodiments, when the storage appliance owner accepts an invitation to share an existing folder, the client application auto-populates the fields 4305, 4310 with information from the storage appliance of the user extending the invitation.

The user interface screen includes a control 4315 to enable sharing of the folder with users who do not have access to a storage appliance. This control 4315 is a check box, although a radio button or any other type of control may be used. In some embodiments, if a storage appliance owner selects this control 4315, the owner allows all users of the system to access the folder on the owner's storage appliance. In other embodiments, selecting the control 4315 allows only the users permitted to access the virtual container associated with the folder to access the folder on the owner's storage appliance. For example, only users who are members of the replication/synchronization group for the folder's virtual container may be allowed to access the folder on the owner's storage appliance. Once the owner selects the submission control 4320, the owner's computing device sends information about the granted access rights to the central service, which stores the information as described in further detail below.

Figure 44:
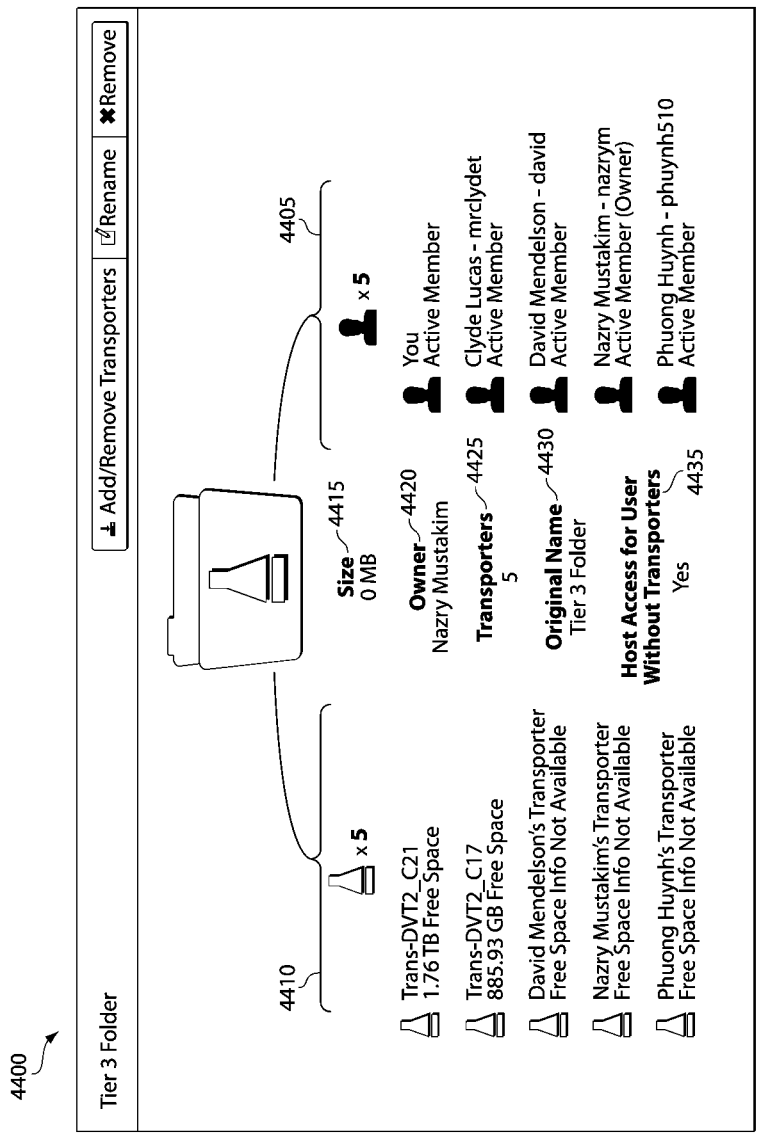
FIG. 44 shows a user interface screen displaying characteristics of a folder associated with a virtual container, including the folder's accessibility to users who do not own any storage appliances.

FIG. 44 shows a user interface screen 4400 displaying characteristics of a folder associated with a virtual container, including the folder's accessibility to users who do not own any storage appliances. In various embodiments, the client application displays a screen similar to user interface screen 4400 whenever a user selects a folder for viewing, such as any of the folders on the user interface screens of FIGS. 19, 20, and 22, to view. The screen 4440 displays the users 4405 with access privileges for the folder's contents and the storage appliances 4410 that each store a copy of the contents of the folder. The screen 4440 also displays the size of the folder's contents 4415, the identity of the folder's owner 4420, the number of storage appliances associated with the virtual container of the folder 4425, the folder's name 4430, and whether the storage appliance owner has granted other users access rights to the folder on his or her storage appliance 4435.

In various embodiments, the central service sends information about granted access rights to each storage appliance. For example, if an owner configured a storage appliance SA1 to share a virtual container VC1 with a user U1, the owner stores that information in his or her account on the central service. In some embodiments, the central service communicates this same information with storage appliance SA1. Thus, when the user U1 seeks to access the virtual container VC1 on the storage appliance SA1, the storage appliance SA1 recognizes that the user U1 is authorized to access the container.

Figure 45:
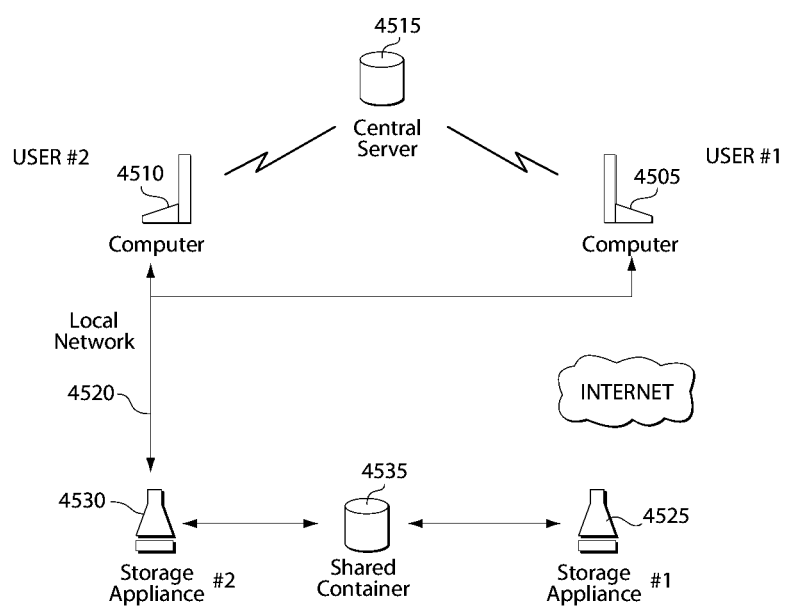
FIGS. 45-46 are schematic diagrams illustrating storage appliance sharing.
Figure 46:
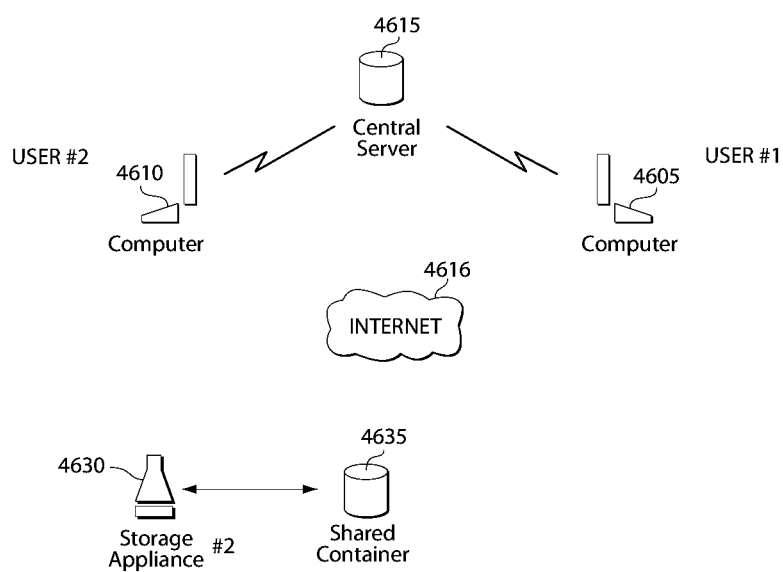

Referring now to FIGS. 45 and 46, schematic diagrams illustrating storage appliance sharing are shown and described. FIG. 45 depicts a scenario in which a user accesses a virtual container on another owner's storage appliance because his or her own storage appliance is remote. Although remote access to the storage appliance is still possible, local access to another owner's appliance would enable the user to access user data faster. In this embodiment, User1 and User2 each have their respective computing devices 4505 and 4510, and each computing device is connected to a central server 4515 administering the central service. The two computing devices 4505, 4510 are connected to the same local area network 4520. The users each own a storage appliance 4525, 4530, which are each linked to the same virtual container 4535. User2's storage appliance 4530 is located on the same local area network 4520 as the two computing devices 4505, 4510, whereas User1's storage appliance 4525 is not.

User2 can grant User1 access to the virtual container on his or her storage appliance 4530. User2 configures his or her account on the central server 4515 to reflect this grant. When User1 accesses the central service from his or her computing device 505, the client application executing on the computing device 4505 requests a list of virtual containers and storage appliances that User1 may access. The central server 4515 searches its database system for such virtual containers and storage appliances and returns a list to User1's computing device 4505. The list includes User2's storage appliance 4530 and the virtual container 4535 that User2 and User1 may both access. In some embodiments, for each entry in the list, the central server 4515 displays the location of the storage appliance relative to User1's computing device 4505. For example, the central server 4515 may indicate that User2's storage appliance 4530 is on the same local area network 4520 as User1's computing device 4505. The central server 4515 may also indicate that User1's computing device 4505 can connect to User1's own storage appliance 4525 only through a wide area network, such as the Internet. In some embodiments, the central server 4515 displays the level of access that User1 has to each virtual container on each storage appliance.

In one example, User1 opts to connect to User2's storage appliance 4530 to access the virtual container. User1 may select User2's storage appliance based on information displayed by the central server 4515 about the relative locations of User1's computing device 4505 and User2's storage appliance 4530. When User1 selects User2's storage appliance 4530 from the displayed list, the central server 4515 provides information about the storage appliance 4530 to the client application on User1's computing device 4505. The client application uses the information to establish a peer-to-peer connection with User2's storage appliance 4530 over the local area network 4520. The storage appliance 4530 recognizes that User1 has access rights to the virtual container 4535 and accepts the connection. The storage appliance 4530 configures the virtual container 4535 presented to User1 according to the level of access that User2 granted to User1.

In some embodiments, when User1's computing device 4505 connects to User2's storage appliance 4530, the client application creates a local virtual drive corresponding to the appliance 4530 on User1's computing device 4505. User2's storage appliance 4530 may send information about its folders and files for display in the local virtual drive. When User1 opens a folder or file, the storage appliance 4530 may send additional information about the folders and files, or the contents of a selected file. As User1 edits a folder or file, his or her computing device 4505 sends the edits back to the storage appliance 4530. In some embodiments, User2's storage appliance 4530 sends copies of its folders and files to User1's computing device 4505 when the local virtual drive is created.

FIG. 46 depicts a scenario in which a user who does not own a storage appliance nevertheless can access a virtual container on another owner's storage appliance. Because the user does not have a storage appliance, the user would normally be unable to access user data on any of the appliances. However, because owners can share their storage appliances, others do not need to be pre-existing users of the storage appliance environment to access data that the users have stored in the appliances.

In this embodiment, User1 and User2 each have their respective computing devices 4605, 4610, and each computing device connects to a central server 4615 administering the central service. The two computing devices 4605, 4610 connect to the central server 4615 over a wide area network 4616, such as the Internet. User2 owns a storage appliance 4630 that stores a virtual container 4635. User2 can grant User1 access to the virtual container on his or her storage appliance 4630. User2 configures his or her account on the central server 4615 to reflect this grant. When User1 accesses the central service 4615 from his or her computing device 4605, the client application executing on the computing device 4605 requests a list of virtual containers and storage appliances that User1 may access. The central server 4615 searches its database system for such virtual containers and storage appliances and returns a list to User1's computing device 4605. The list includes User2's storage appliance 4630 and a virtual container 4635 on the appliance 4630. In some embodiments, the central server 4615 displays the location of the storage appliance 4630 and/or the level of access that User1 has to the virtual container 4635.

By selecting the virtual container 4635 on User2's storage appliance 4630, the central server 4615 provides information about the storage appliance 4630 to the client application on User1's computing device 4605. The client application uses the information to establish a connection, on a peer-to-peer basis, with the storage appliance 4630 over the wide area network 4616. The storage appliance 4630 recognizes that User1 has access rights to the virtual container 4635 and accepts the connection. The storage appliance 4630 configures the virtual container 4635 presented to User1 according to the level of access that User2 granted to User1.

In some embodiments, User1's computing device 4605 may connect to User2's storage appliance 4630, and User1's computing device 4605 may create a local virtual drive corresponding to the appliance 4630. The storage appliance's folders and files may be copied or represented to User1 in a local virtual drive on User1's computing device 4605, as described herein.

In further detail regarding storage appliance owners' grants of access to non-owners, when an owner configures his or her account, the central service updates the information about relationships between users, storage appliances, and virtual containers. The owner selects a virtual container and its corresponding appliance to share. The owner inputs the identities of non-owners allowed to access virtual container on the appliance. The central service stores the relationships between the virtual container, the appliance and the identities of non-owners granted access.

By way of example, consider the relationships between users, storage appliances, and virtual containers depicted in Table 1 and FIGS. 1-2. In one example, a first registered user RU1 decides to grant a second user RU2 access to a virtual container VC4 on the first user's RU1 own storage appliance SA1. Because the second user RU2 owns the virtual container VC4, the second user RU2 would normally be able to access this virtual container on his or her own storage appliance SA2.

To grant the second user RU2 access, the first user RU1 logs into his or her account on the central service and selects the virtual container VC4 stored on the storage appliance SA1 to share. The first user RU1 inputs the second user's RU2 identifier, thereby designating the second user RU2 as a user authorized to access the virtual container VC4 on the first user's RU1 storage appliance SA1. In this example, the first user RU1 grants the second user RU2 read-only rights to the virtual container VC4 stored on the storage appliance SA1. Thus, even though the second user RU2 owns the virtual container VC4 and would be able to edit the copy of his or her own storage appliance SA2, the second user RU2 can only read the container's VC4 contents when they are accessing the contents through the first user's RU1 storage appliance SA1.

Thus, part of the schematic representation in Table 1 may be updated to reflect RU1's permission grant of SA1 to RU2, with the updates being shown in italics.

TABLE 1

CENTRAL SERVICE
. . .
Storage Appliances
SA1 (owned by RU1, *shared with RU2*)
SA2 (owned by RU2)
. . .
*RU2 authorized to access:*
    *SA1 (VC4 only - read access only)*
. . .

When the second user RU2 logs into his or her account, the client application executing on the second user's RU2 computing device requests a list of virtual containers and storage appliances accessible to the second user RU2. The central service sends the computing device a list that includes the virtual container VC4 on the storage appliance SA1. The computing device of the second user RU2 can connect, on a peer-to-peer basis, to the first user's RU1 storage appliance SA1 to read the virtual container's VC4 contents.

In another example, the second registered user RU2 decides to grant a third user RU3 access to a virtual container VC4 on the second user's RU2 own storage appliance SA2. The second user RU2 logs into his or her account on the central service and selects the virtual container VC4 stored on the storage appliance SA2 to share. The second user RU3 inputs the third user's RU3 identifier, thereby designating the third user RU3 as a user authorized to access the virtual container VC4 on the second user's RU2 storage appliance SA2. In this example, the second user RU3 grants the third user RU3 full access rights (e.g., read/write rights).

Thus, part of the schematic representation in Table 1 may be updated to reflect RU2's permission grant of SA2 to RU3, with the updates being shown in italics.

TABLE 1

CENTRAL SERVICE
...
Registered Users
    RU1
    RU2
    *RU3*
...
Storage Appliances
    SA1 (owned by RU1)
    SA2 (owned by RU2, *shared with RU3*)
...
Virtual Containers
    VC3 (owned by RU1)
    VC4 (owned by RU2, *shared with RU3 only on SA2*)
...
*RU3 authorized to access:*
    *SA2 (VC4 only - full access)*
...
SA2 linked to:
    VC4 (owned by RU2, *shared with RU3*)
...

When the third user RU3 logs into his or her account, the client application executing on the third user's RU3 computing device requests a list of virtual containers and storage appliances accessible to the third user RU3. The central service sends the computing device a list that includes the virtual container VC4 on the storage appliance SA2. The computing device of the third user RU3 can connect, on a peer-to-peer basis, to the second user's RU2 storage appliance SA2 to read or write to the virtual container's VC4 contents.

Figure 47:
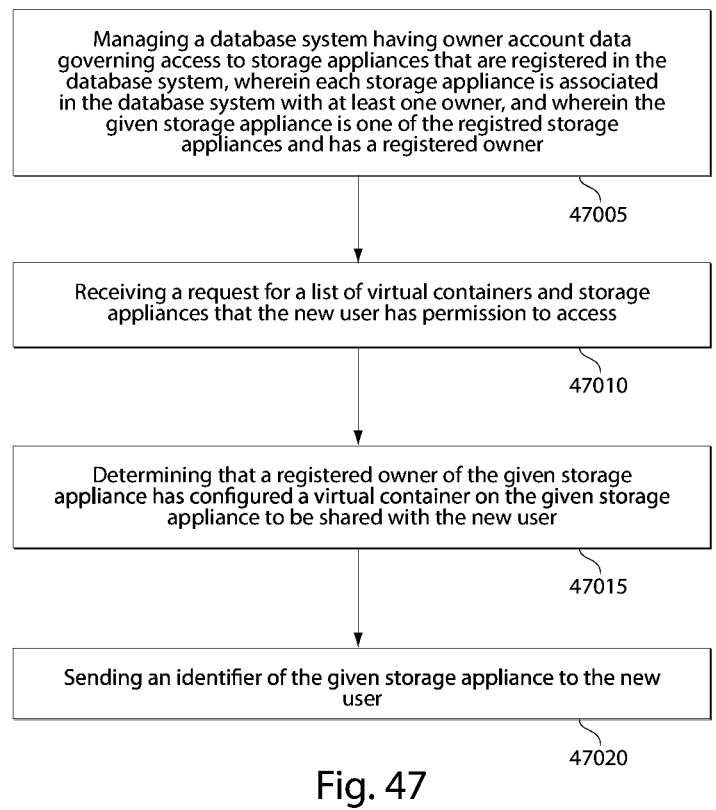
FIG. 47 is flow diagram of an exemplary method of providing to a new user access to a given storage appliance coupled to a computer networks.

Referring now to FIG. 47, a flow diagram of an exemplary method of providing to a new user access to a given storage appliance coupled to a computer networks is shown and described. The method includes managing, at a server, a database system having owner account data governing access to storage appliances that are registered in the database system, wherein each storage appliance is associated in the database system with at least one owner, and wherein the given storage appliance is one of the registered storage appliances and has a registered owner (step 47005). The method includes receiving, from the new user at a computing device, a request for a list of virtual containers and storage appliances that the new user has permission to access (step 47010). The method includes determining, by the server, that a registered owner of the given storage appliance has configured a virtual container on the given storage appliance to be shared with the new user (step 47015). The method includes sending, by the server, an identifier of the given storage appliance to the new user (step 47020).

P. Miscellaneous

In certain embodiments described above, relationship information and invitations were handled by or through a central service. It should be noted that, in certain alternative embodiments, certain invitations and relationship information may be handled outside of a central service, such as, for example, by (a) having a user distribute a code to his or her storage appliance that allows one or more other users to set up a relationship with the storage appliance; (b) having a user log into another user's storage appliance to set up a relationship; (c) having individual users coordinate their own storage appliances in such a way that two or more users can establish peer-to-peer relationship(s) for sharing data; or (d) having a user effectuate invitations using an identifier associated with another user or another user's storage appliance. For example say that user A wants share a container with user B; each user could provide an identifier for his storage appliance to the other user, and each user could configure his own storage device with the other's identifier so that the two storage appliances will locate one another and exchange data with one another.

In typical embodiments, the storage appliances are fully authenticated, e.g., using a pre-configured key associated with each storage appliance.

For communications between the central service and a storage appliance, the central service may push information to the storage appliance and/or the storage appliance may in some cases pull information from the central service (e.g., by sending requests to the central service, such as when the storage appliance receives a request for data from another storage appliance).

In various embodiments, communications between storage appliances may be selectively or always encrypted.

Similarly, data stored in storage appliances may be selectively encrypted.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions. Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client," "server," "peer," and "appliance" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and Internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and Internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and Internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A computer program product for propagating, over a wide area network, a change, to data in a local storage appliance under control of a first computing device of a first user, to remote storage appliances under control of computing devices of other users, the computer program product comprising a non-transitory computer-readable medium having computer readable program code stored thereon, wherein the computer readable program code, when being run by a processor in the local appliance, is configured to cause the local storage appliance to perform computer processes comprising:
receiving a change to data in a virtual container associated with the local storage appliance, the local storage appliance being under control of the first computing device of the first user;
responsive to the change, sending a request over a wide area network to a central server for information regarding the virtual container, the central server storing a set of relationships, each relationship identifying a distinct remote storage appliance that has been granted sharing privileges for the virtual container and is thus linked to the virtual container;
in response to the request, receiving over the wide area network from the central server identifying information for a set of remote storage appliances, corresponding to the set of relationships with respect to the virtual container, wherein the set of remote storage appliances is controlled via computing devices of users other than the first user; and
transmitting, over the wide area network, a data update corresponding to the change from the local storage appliance to the set of remote storage appliances, on a peer-to-peer basis, so that the set of remote storage appliances are updated to reflect the change.

2. The computer program product of claim 1, wherein sending the request includes sending an identifier for the virtual container.

3. The computer program product of claim 1, wherein sending the request includes sending a GetReplicationTargetsForContainer request.

4. The computer program product of claim 1, wherein receiving the identifying information includes receiving identifying information under conditions wherein the set of remote storage appliances corresponds to a replication/synchronization group associated with the virtual container.

5. The computer program product of claim 1, wherein transmitting to the set of remote storage appliances includes establishing peer-to-peer connections with the set of remote storage appliances.

6. The computer program product of claim 1, wherein transmitting to the remote storage appliance includes establishing secure connections over the wide area network with the set of remote storage appliances.

7. The computer program product of claim 1, wherein transmitting to the set of remote storage appliances includes transmitting updated Container change history information.

8. The computer program product of claim 1, wherein transmitting to the set of remote storage appliances includes transmitting updated file version history information.

9. The computer program product of claim 1, wherein transmitting to the set of remote storage appliances includes transmitting updated file data.

10. The computer program product of claim 1, wherein transmitting to the set of remote storage appliances includes transmitting updated metadata associated with files in the virtual container, wherein the metadata is associated with organization of the files.

11. The computer program product of claim 1, wherein the computer processes further comprise:
sending to the central server over the wide area network a status update message regarding the change.

12. A method of providing to a new user access to a given storage appliance that is (1) under control of a computer device of another user and (2) coupled to a computer network, the method comprising:
managing, at a server, a database system having owner account data governing access to storage appliances that are registered in the database system, wherein (i) each storage appliance is associated in the database system with at least one owner, (ii) the given storage appliance is one of the registered storage appliances and has a registered owner, (iii) the database system stores a set of relationships that identify users, in addition to the registered owners, who have been granted sharing privileges to storage appliances and their associated virtual containers, and (iv) the storage appliances are configured to share data with each other on a peer-to-peer basis in accordance with the set of relationships that are stored in the database system;
receiving at the server, from a computing device of the new user, a request for a list of virtual containers and storage appliances for which the new user has been granted sharing privileges;
in response to the request, determining, by the server, that a registered owner of the given storage appliance has configured a virtual container on the given storage appliance to be shared with the new user; and
sending, by the server, an identifier of the given storage appliance of the registered owner to the computing device of the new user, so that the computing device can access data on the given storage appliance on a peer-to-peer basis in accordance with the sharing privileges stored in the database system.

13. The method of claim 12, wherein managing the database system comprises:
receiving, by the server, an indication of an access grant to the new user for the virtual container on the given storage appliance, wherein the indication is received from the registered owner of the given storage appliance; and
storing, by the server, information about the access grant to the new user.

14. The method of claim 13, wherein receiving the indication of the access grant comprises:
receiving, by the server, an indication of access selected from the group consisting of a grant of read access, a grant of read and write access, and a grant of write access.

15. The method of claim 12, wherein managing the database system comprises:
receiving, by the server, an indication of an access grant to a group of users, wherein the new user is a member in the group; and
storing, by the server, information about the access grant to each member of the group.

16. The method of claim 12, wherein receiving the request for the list of virtual containers and storage appliances comprises:
receiving the request from a client application executing on the computing device.

17. The method of claim 12, wherein determining that the registered owner has configured the virtual container on the given storage appliance to be shared comprises:
retrieving, by the server, the identifier of the given storage appliance from a list of storage appliances that the new user has permission to access.

18. The method of claim 12, wherein determining that the registered owner has configured the virtual container on the given storage appliance to be shared comprises:

displaying, by the server, information about the relative locations of the given storage appliance and the computing device of the new user.

19. The method of claim 18, wherein displaying the information about the relative locations comprises:
displaying, by the server, an indication that the given storage appliance and the computing device of the new user are located on the same local area network.

20. The method of claim 18, wherein displaying the information about the relative locations comprises:
displaying, by the server, an indication that the given storage appliance and the computing device of the new user can communicate over a wide area network.

* * * * *